(12) United States Patent
Pinkerton et al.

(10) Patent No.: US 7,783,880 B2
(45) Date of Patent: Aug. 24, 2010

(54) METHOD AND APPARATUS FOR SECURE INTERNET PROTOCOL (IPSEC) OFFLOADING WITH INTEGRATED HOST PROTOCOL STACK MANAGEMENT

(75) Inventors: James T. Pinkerton, Sammamish, WA (US); Avnish K. Chhabra, Bellevue, WA (US); Sanjay N. Kaniyar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1120 days.

(21) Appl. No.: 11/036,167

(22) Filed: Jan. 14, 2005

(65) Prior Publication Data

US 2006/0104308 A1    May 18, 2006

Related U.S. Application Data

(60) Provisional application No. 60/627,395, filed on Nov. 12, 2004.

(51) Int. Cl.
   *H04L 29/06* (2006.01)
(52) U.S. Cl. .................. 713/151; 713/192; 370/469
(58) Field of Classification Search .............. 713/151, 713/192; 370/469
   See application file for complete search history.

(56) References Cited

U.S. PATENT DOCUMENTS

| | | | |
|---|---|---|---|
| 5,898,713 A * | 4/1999 | Melzer et al. ............... 714/807 |
| 6,094,712 A | 7/2000 | Follett et al. | |
| 6,141,705 A | 10/2000 | Anand et al. | |
| 6,226,680 B1 | 5/2001 | Boucher et al. | |
| 6,247,060 B1 | 6/2001 | Boucher et al. | |
| 6,334,153 B2 | 12/2001 | Boucher et al. | |
| 6,963,946 B1 * | 11/2005 | Dwork et al. ............... 710/310 |
| 7,023,863 B1 * | 4/2006 | Naudus et al. .............. 370/401 |
| 7,181,531 B2 * | 2/2007 | Pinkerton et al. ........... 709/238 |
| 7,225,332 B2 * | 5/2007 | Minnick et al. ............. 713/160 |
| 7,254,637 B2 | 8/2007 | Pinkerton et al. | |
| 7,558,956 B2 * | 7/2009 | Tsuji et al. .................. 713/168 |

(Continued)

FOREIGN PATENT DOCUMENTS

EP         1 427 133 A2    12/2003

(Continued)

OTHER PUBLICATIONS

"The Layered Approach: The OSI Model", Data and Computer Communications, 1991, pp. 446-456.

(Continued)

*Primary Examiner*—David Garcia Cervetti
(74) *Attorney, Agent, or Firm*—Wolf, Greenfield & Sacks, P.C.

(57) ABSTRACT

The invention provides mechanisms for transferring processor control of secure Internet Protocol (IPSec) security association (SA) functions between a host and a target processing devices of a computerized system, such as processors in a host CPU and a NIC. In one aspect of the invention, the computation associated with authentication and/or encryption is offloaded while the host maintains control of when SA functions are offloaded, uploaded, invalidated, and re-keyed. The devices coordinate to maintain metrics for the SA, including support for both soft and hard limits on SA expiration. Timer requirements are minimized for the target. The offloaded SA function may be embedded in other offloaded state objects of intermediate software layers of a network stack.

19 Claims, 16 Drawing Sheets

U.S. PATENT DOCUMENTS

| | | | |
|---|---|---|---|
| 2001/0021949 A1 | 9/2001 | Blightman et al. | |
| 2001/0023460 A1 | 9/2001 | Boucher et al. | |
| 2001/0027496 A1 | 10/2001 | Boucher et al. | |
| 2001/0042204 A1* | 11/2001 | Blaker et al. | 713/165 |
| 2001/0047433 A1 | 11/2001 | Boucher et al. | |
| 2001/0047487 A1* | 11/2001 | Linnakangas et al. | 713/201 |
| 2002/0062344 A1* | 5/2002 | Ylonen et al. | 709/204 |
| 2002/0157024 A1* | 10/2002 | Yokote | 713/201 |
| 2002/0188871 A1* | 12/2002 | Noehring et al. | 713/201 |
| 2002/0191604 A1* | 12/2002 | Mitchell et al. | 370/389 |
| 2003/0046585 A1* | 3/2003 | Minnick | 713/201 |
| 2003/0061495 A1* | 3/2003 | Minnick | 713/189 |
| 2003/0158906 A1* | 8/2003 | Hayes | 709/211 |
| 2003/0161327 A1* | 8/2003 | Vlodavsky et al. | 370/395.52 |
| 2003/0169877 A1* | 9/2003 | Liu et al. | 380/28 |
| 2003/0204631 A1* | 10/2003 | Pinkerton et al. | 709/249 |
| 2003/0204634 A1* | 10/2003 | Pinkerton et al. | 709/250 |
| 2004/0039936 A1* | 2/2004 | Lai | 713/201 |
| 2004/0049585 A1* | 3/2004 | Swander | 709/229 |
| 2004/0117614 A1* | 6/2004 | Minnick et al. | 713/153 |
| 2004/0139313 A1* | 7/2004 | Buer et al. | 713/150 |
| 2004/0143734 A1* | 7/2004 | Buer et al. | 713/153 |
| 2004/0205332 A1* | 10/2004 | Bouchard et al. | 713/153 |
| 2005/0060538 A1* | 3/2005 | Beverly | 713/160 |
| 2005/0066060 A1 | 3/2005 | Pinkerton et al. | |
| 2005/0144300 A1* | 6/2005 | Craft et al. | 709/230 |
| 2005/0147126 A1* | 7/2005 | Qiu et al. | 370/474 |
| 2005/0188074 A1* | 8/2005 | Voruganti et al. | 709/224 |
| 2005/0198531 A1* | 9/2005 | Kaniz et al. | 713/201 |
| 2005/0213603 A1* | 9/2005 | Karighattam et al. | 370/463 |
| 2005/0256975 A1* | 11/2005 | Kaniz et al. | 709/250 |
| 2006/0265585 A1* | 11/2006 | Lai | 713/151 |
| 2007/0071007 A1* | 3/2007 | Ross | 370/392 |

FOREIGN PATENT DOCUMENTS

| | | |
|---|---|---|
| WO | WO 99/64952 A1 | 12/1999 |
| WO | WO 99/68219 | 12/1999 |
| WO | WO 02/27519 A1 | 4/2002 |
| WO | WO 03/021443 A1 | 3/2003 |

OTHER PUBLICATIONS

Extended European Search Report from corresponding European Application No. 05110575, Mar. 2006.

* cited by examiner

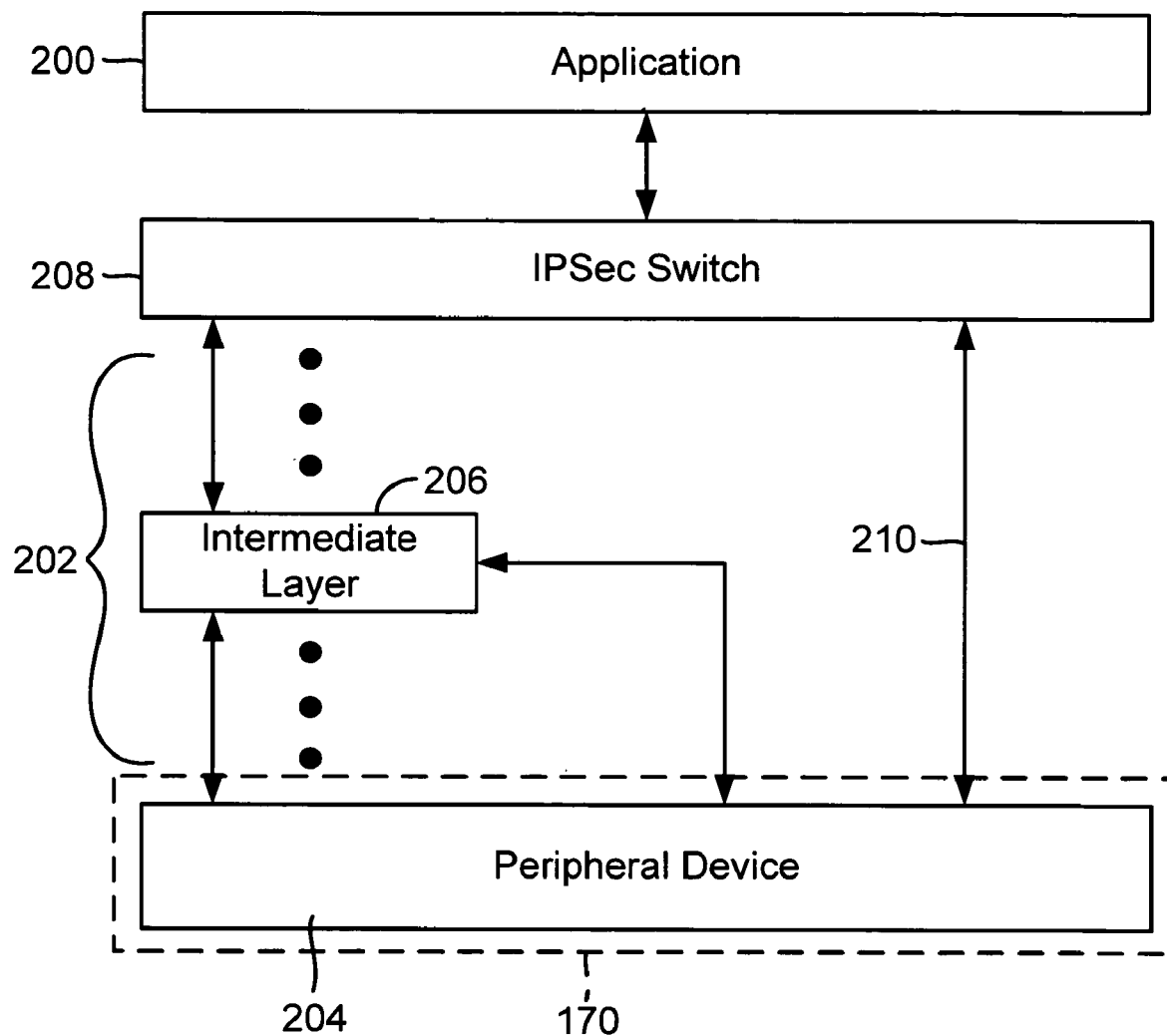

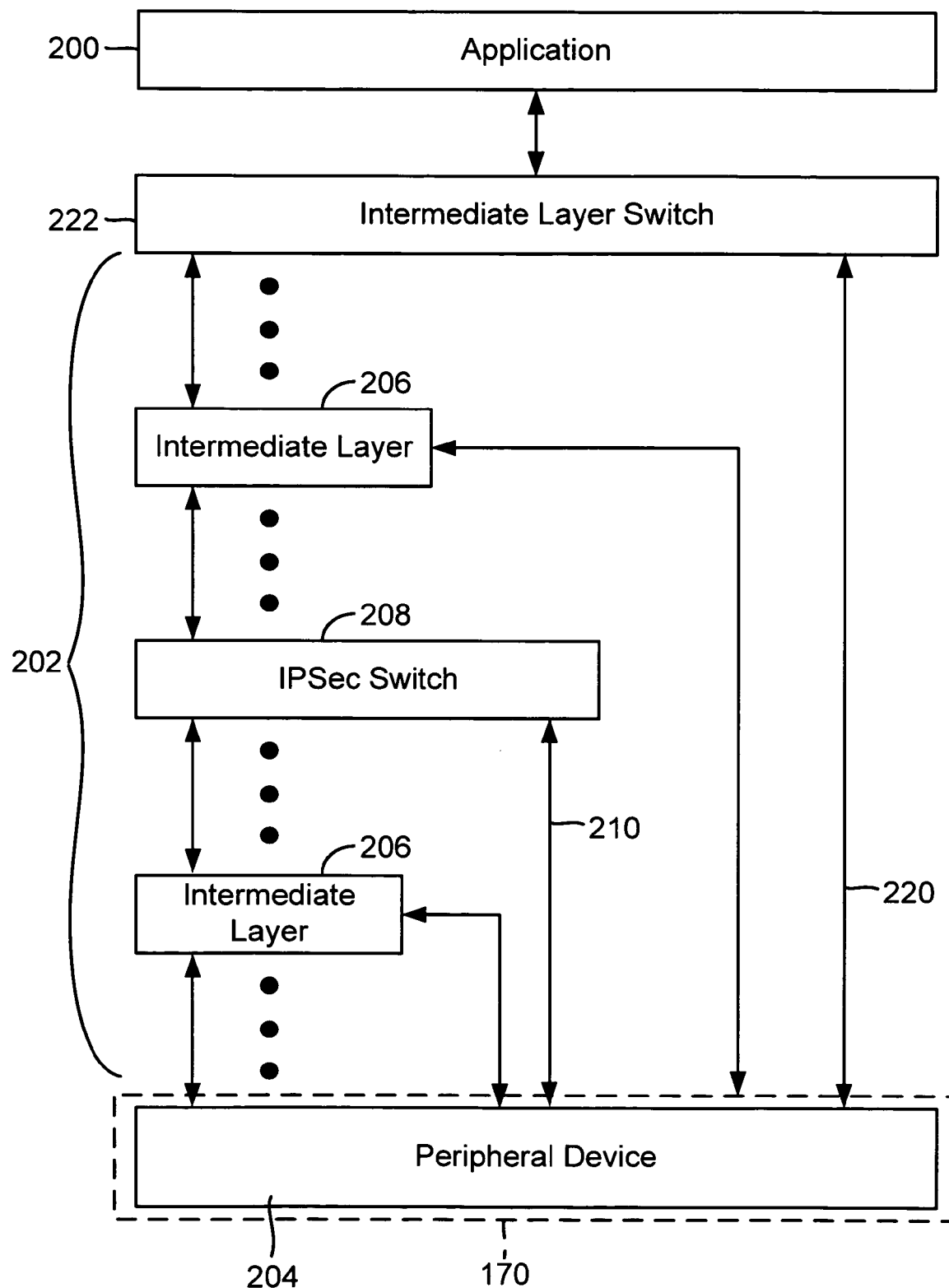

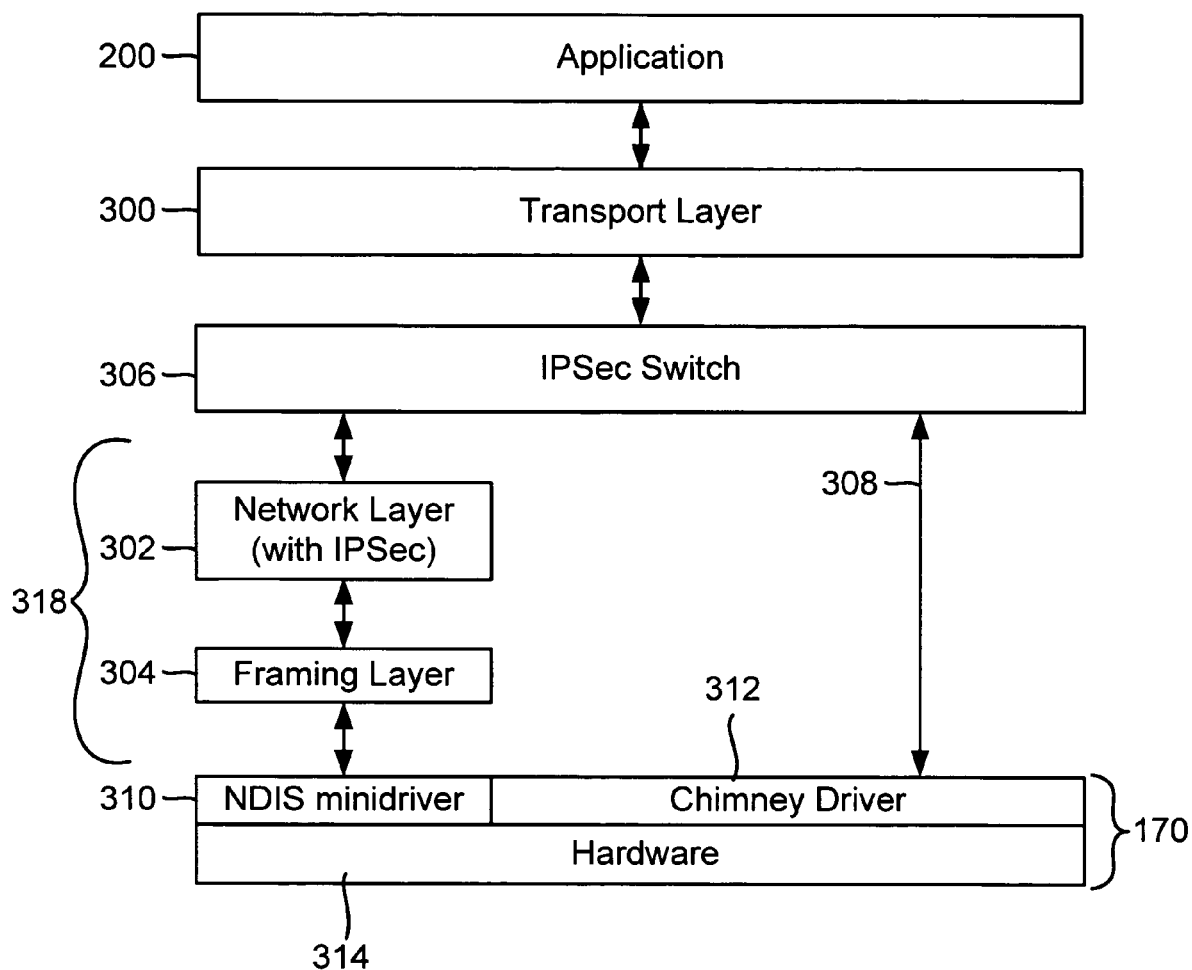

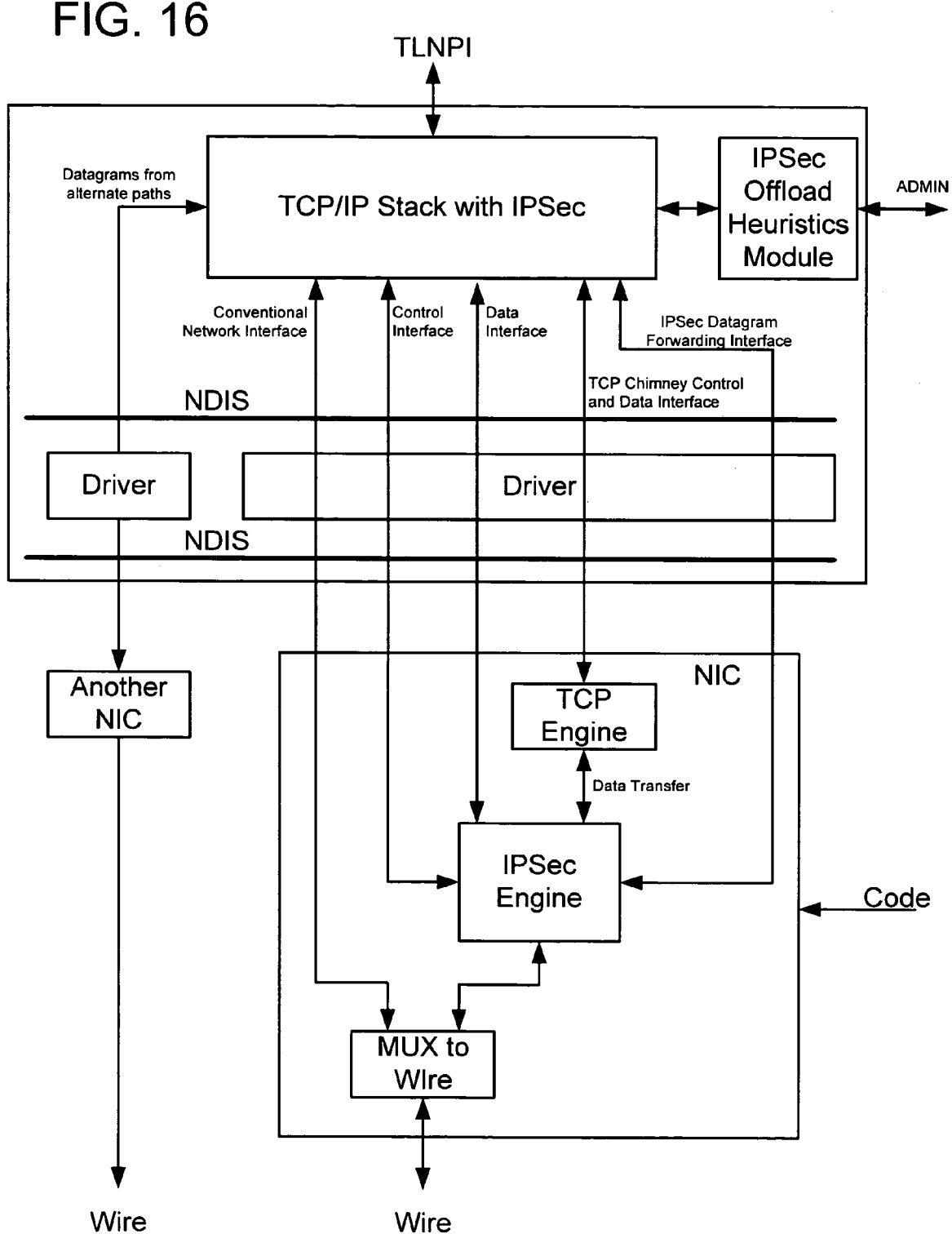

METHOD AND APPARATUS FOR SECURE INTERNET PROTOCOL (IPSEC) OFFLOADING WITH INTEGRATED HOST PROTOCOL STACK MANAGEMENT

CROSS-REFERENCE TO RELATED PATENT APPLICATIONS

This patent application claims the benefit of U.S. Provisional Patent Application No. 60/627,395, filed Nov. 12, 2004.

FIELD OF THE INVENTION

The present invention relates generally to computer networking technology. More particularly, the present invention relates generally to mechanisms for optimizing the offload of network computing tasks.

BACKGROUND OF THE INVENTION

The complexity and sophistication of operating systems, application software, networking technology, and the like continue to increase at dramatic rates, resulting in increased computer functionality. This increased functionality often results in increased Central Processor Unit (CPU) load (hereinafter also referred to as "CPU overhead") due to the additional duties that must be performed by the CPU to implement the increased functionality.

One area where the increase in CPU overhead is readily apparent is in the area of networked applications where network speeds are increasing due to the growth in high bandwidth media. Network speeds may even rival the CPU processor speed and access speeds for local memory at host computers. These networked applications further burden the host processor due to the layered architecture used by most operating systems, such as the seven-layer Open System Interconnect (OSI) model or the layered model used by the Windows operating system.

As is well known, such a model is used to describe the flow of data between the physical connection to the network and the end-user application. The most basic functions, such as putting data bits onto the network cable, are performed at the bottom layers, while functions attending to the details of applications are at the top layers. Essentially, the purpose of each layer is to provide services to the next higher layer, shielding the higher layer from the details of how services are actually implemented. The layers are abstracted in such a way that each layer believes it is communicating with the same layer on the other computer.

Various functions that are performed on a data packet as it proceeds between layers can be software intensive, and thus often require a substantial amount of CPU processor and memory resources. For instance, certain functions that are performed on the packet at various layers are extremely CPU intensive, such as packet checksum calculation and verification, message digest calculation, TCP segmentation, TCP retransmission and acknowledgment (ACK) processing, packet filtering to guard against denial of service attacks, and User Datagram Protocol (UDP) packet fragmentation. As each of these functions is performed, the resulting demands on the CPU can greatly affect the throughput and performance of the overall computer system.

As on-line sales and telecommuting uses increase, the security of data transmission has become increasingly important. This has required additional security functions to be performed on the data packet. These security functions include ensuring the privacy of data during its transmission across the different communication networks, ensuring the data packet is coming from an authenticated end host, application, or user, and ensuring that the data has not been modified during its transmission across different communication networks. For the purposes of this application, secure data transmission is defined as data transmission where any combination of one or more of privacy, authentication, or data integrity can be assumed end-to-end. Several standards have been developed to facilitate secure data transmission over data networks. These standards provide a method for remote systems to establish a secure session through message exchange and calculations, thereby allowing sensitive data being transmitted across the different communication networks to remain secure and tamper free (i.e., untampered). For example, the Internet security protocol ("IPSec") may be used to establish secure host-to-host pipes, user level security, application level security, connection level security, and virtual private networks over the Internet. IPSec defines a set of specifications for cryptographic encryption and authentication. IPsec also supports several algorithms for key exchange, including an Internet Key Exchange ("IKE") algorithm for establishing keys for secure sessions established between applications. The encryption and decryption of data (e.g., SSL encryption and IP Security encryption) is CPU intensive. For example, the current estimate for TCP send processing is about 2 cycles per byte of data transferred. For IPSec authentication, the CPU overhead varies, but in round numbers is approximately 15 cycles per byte. For encryption, the CPU overhead rises to between about 25 cycles per byte and about 145 cycles per byte.

From the above numbers, it can be seen that performing the tasks to establish a secure session is CPU intensive. The host processor performing all of these tasks can result in system performance suffering because resources are consumed for the tasks. The decrease in system performance impacts a network and users in various ways, depending on the function of the network element (e.g., routing, switching, serving, managing networked storage, etc.).

As the demand on CPU resources grows, the capability and throughput of computer hardware peripherals such as network interface cards (NICs) and the like are also increasing. These peripherals are often equipped with a dedicated processor and memory that are capable of performing many of the tasks and functions that are otherwise performed by the CPU.

Coprocessors have been developed to offload some of the tasks from the host processor. Some coprocessors have been developed to perform a specific primitive task for the host processor (e.g., hash data). However, the addition of a task specific coprocessor does not offload from the host processor a significant amount of the secure session establishment tasks. One alternative is to add multiple coprocessors to a system, each processor performing a different task. Such an alternative is limited by physical constraints (e.g., number of slots on a computer in which cards are connected) and introduces the problem of multiple communications between the host processor and the multiple coprocessors.

Other processors have been developed to perform more than one of the tasks required to establish a secure session. As an example of this, assume a processor can perform a cryptographic operation (i.e., an encrypt or decrypt), a key generation operation, and a hash operation. When a server has received a request to establish a secure session, the server must call the processor to decrypt a pre-master secret received from a client. To generate a master secret and key material, the host processor must make approximately twenty calls to the processor (one for each hash operation). As illustrated by this example, a processor that can perform multiple tasks does not solve the issue of resource consumption from multiple communications between the host processor and the coprocessor.

Accordingly, there is a need in the art to reduce the overhead associated with offloading of IPSec functions from a processor to a processor such as a peripheral device. In particular, there is a need for solutions for offloading IPSec functions while simultaneously maintaining processing requirements for the individual connections.

BRIEF SUMMARY OF THE INVENTION

The present invention overcomes one or more of the foregoing problems with the prior state of the art by providing a method of reliably offloading and uploading the computation, including packet generation, associated with IPSec authentication and/or decryption.

In a network stack, two or more IPSec security associations may traverse through one or more of the same intermediate software layers. Each of the software layers has a state object, which may include one or more of a constant state variable, a cached state variable, and a delegated state variable. For any software layer, the host offloads processing control to a peripheral device for a layer's delegated stated variables to enable the peripheral device to independently transfer data. For cached state variables, the host retains control of the cached state variables, and updates the peripheral device if the cached state variable changes. For constant state variables, their value does not change for the lifetime of the offload. Thus, though the host may offload the state object to a peripheral device, the state of the system remains consistent, even if events cause cached or delegated state variables to be changed.

The path data transfer takes between two hosts is represented by the path state object. If two connections transfer data through the same path, then they will share the same path state object. Thus there is a resulting hierarchy of state objects that generally takes the form of an inverted tree data structure. The host may offload the entire inverted tree data structure to the peripheral device, allowing the host to offload processing control to the peripheral device of multiple connections at once. This ability to cleanly offload multiple, specific network functions such as the computation associated with authentication and/or encryption while the host maintains control of when security association (SA) functions are offloaded, uploaded, invalidated, and re-keyed allows the host to preserve CPU cycles without compromising desired network functions, network management, integrity, fault tolerance, and security, and further allows the present invention to be practiced in a wide variety of environments. The devices coordinate to maintain metrics for the SA, including support for both soft and hard limits on SA expiration. Timer requirements are minimized for the target. The offloaded SA function may be embedded in other offloaded state objects of intermediate software layers of a network stack.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features in accordance with the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2a is a block diagram illustrating the functional layers of the network stack and the IP security alternate path in accordance with the present invention;

FIG. 2b is a block diagram illustrating the functional layers of the network stack with the IP security alternate path embedded in another offload chimney in accordance with the present invention;

FIG. 3a is a block diagram illustrating the functional layers of the network stack and the IP security bypass path in accordance with the present invention;

FIG. 16 is a block diagram illustrating a security threat model of the IP security offload.

DETAILED DESCRIPTION OF THE PREFERRED EMBODIMENTS

Figure 1:
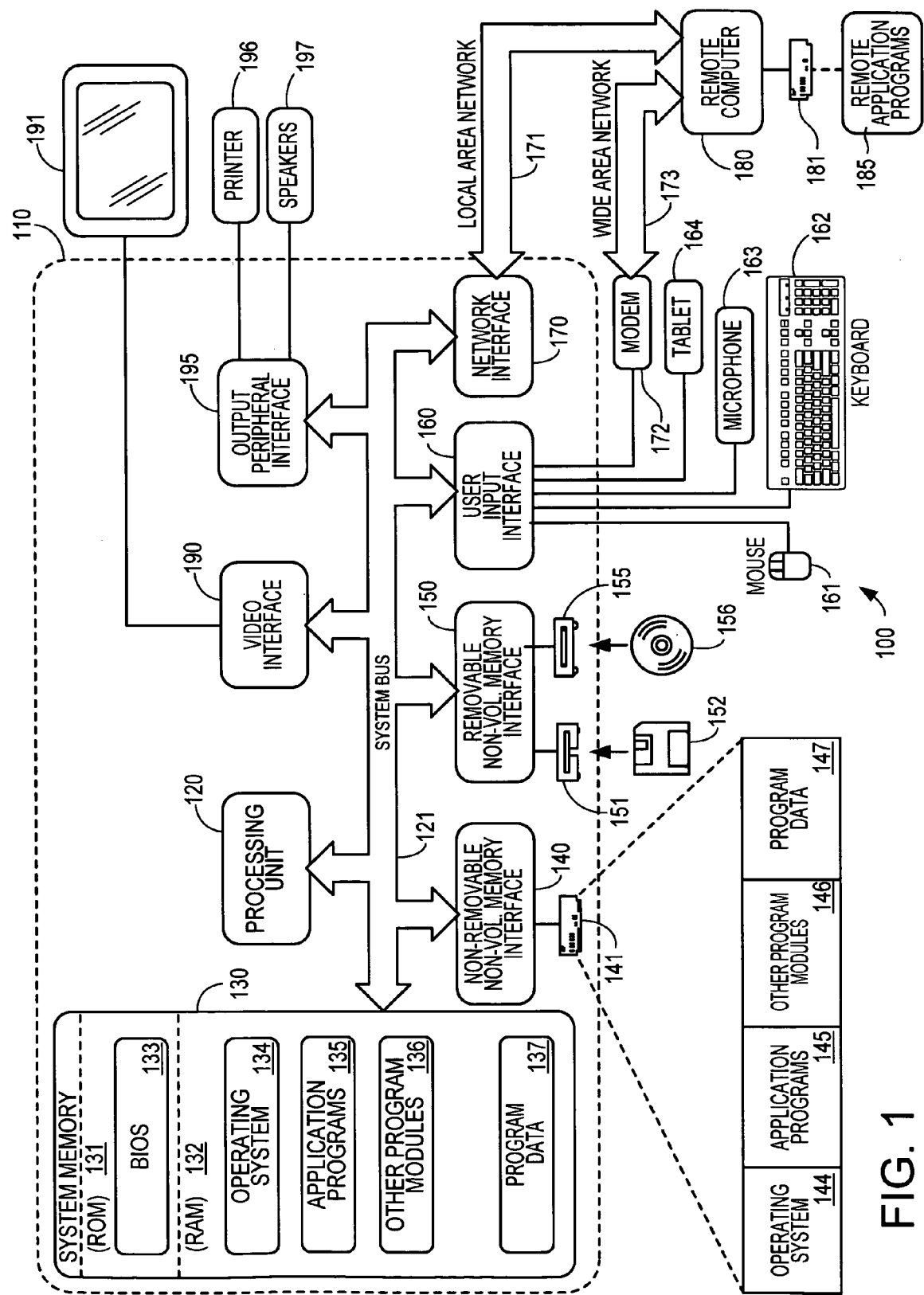
FIG. 1 is a suitable computing system that may implement features in accordance with the present invention.

The present invention relates generally to computer networking technology. More particularly, the present invention relates generally to mechanisms for optimizing the offload of computing tasks associated with IPSec authentication and/or encryption (referred to as "IPSec operations") that are typically performed by a host processor to a processing module, and for returning control to the host processor as appropriate. The processing module processes the offloaded IPSec operations as described below in software, in hardware, or a mix of software and hardware. The processing module may be in a separate interface card, part of a motherboard, in an internal or external card, another processor in a multiple processor unit, and the like. Another way is to embed the functionality of the processing module in a peripheral device, such as, for example, a network interface card, that processes the offloaded network stack operations as described below in software, in hardware, or a mix of software and hardware. The peripheral device may have one or more processors.

By way of explanation, and not of limitation, one will appreciate after reading the specification and claims that a "peripheral device" can include such components as a Network Interface Card, as well as a general purpose CPU with a network adapter, a network processing engine with a dedicated CPU, a traditional miniport with an offload NIC, or a hardware state machine implementation, etc. The following discussion, therefore, describes an inventive method that is cost-effective in terms of CPU cycles.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features in accordance with the present invention will become more fully apparent from the following description and appended claims, or may be learned by the practice of the invention as set forth hereinafter.

Embodiments within the scope in accordance with the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, networked peripherals (e.g., networked printers) and the like. The invention may also be practiced in distributed computing environments where tasks are performed by remote processing devices that are linked through a communications network. In a distributed computing environment, program modules may be located in both local and remote memory storage devices.

Turning now to FIG. 1, a brief, general description of a suitable computing environment in which the invention may be implemented will be described. FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, networked peripherals (e.g., networked printers), distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may have a single processor or multiple processors. The system bus 121 may be any of several types of bus structures including a memory bus or memory controller, a peripheral bus, a cross-bar, a switched bus fabric, and a local bus using any of a variety of bus architectures. The system bus 121 may also be a hierarchy of buses. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, No Cache Non-Uniform Memory Access (NC-NUMA) architecture bus, Cache-Coherent Non-Uniform Memory Access (CC-NUMA) architecture bus, GIGARING network bus, FICON bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies.

A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, video input, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197, printer 196, and a video output, which may be connected through an output peripheral interface 195.

The computer 110 may operate in a networked environment using logical connections to one or more remote computers, such as a remote computer 180. The remote computer 180 may be another personal computer, a server, a router, a network peripheral device (e.g., a printer), a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter (e.g., a network interface card (NIC)) 170. While represented as a single box, the network interface 170 has multiple instantiations and can be implemented in a variety of ways. One way is that there is a processing module having one or more processors that is connected directly to the system bus with a network interface card connected directly to the system bus with the processing unit and network interface card communicating with each other across the system bus. The processing module processes the offloaded network stack operations as described below in software, in hardware, or a mix of software and hardware. The processing module may be in a separate interface card, part of a motherboard, in an internal or external card, another processor in a multiple processor unit, and the like. Another way is to embed the functionality of the processing module in a peripheral device, such as, for example, a network interface card, that processes the offloaded network stack operations as described below in software, in hardware, or a mix of software and hardware. The peripheral device may have one or more processors. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

In the description that follows, a peripheral device having the functionality to perform network stack operations shall be used to describe the invention. As used below, the peripheral device 204 refers not only to a peripheral device, but also to any of the other embodiments of the processing module described above when the peripheral device is being described in terms of processing the offloaded IPSec operations (i.e., the peripheral device processes the offloaded IPSec operations in software, in hardware, or a mix of software and hardware). FIG. 2a illustrates the interrelationship of some of the components that make up a networking model and the components of the present invention. FIG. 2b illustrates the interrelationship of some of the components that make up a networking model and the components of the present invention when the components of the present invention are embedded in another chimney. During normal operation, networked messages are sent by the application 200 through network stack 202 to the peripheral device 204 where the messages are sent to other devices and applications on the network. Additionally, networked messages may be received from the other devices and applications using the peripheral device, which then passes the networked messages through the network stack 202 to the application 200. The network stack 202 includes one or more intermediate software layers 206. Data sent from application 200 travels through the intermediate software layer(s) 206 where specific operations may be performed on the data such as packaging the data, reliable data transmission, and calculation of a message digest.

The IPSec switch 208 is used to offload the processing unit 120 from performing IPSec operations for the intermediate software layer(s) 206 (i.e., at least one of the intermediate layers requires IPSec operations or has an IPSec layer). While the IPSec switch 208 is shown separately, it should be noted that the IPSec switch 208 may be integrated into an intermediate layer of the network stack 202. Other intermediate layers may be above the IPSec switch (not shown). After offloading the IPSec operations, data is sent to the peripheral device 204 via chimney 210 for the peripheral device 204 to perform IPSec operations. In this hierarchy, the intermediate software layers above the IPSec switch and IPSec operations do not have to exclusively reside in the host or the peripheral device and it allows any of the intermediate layers to either be completely offloaded, to remain in the host, or a combination of both (e.g., offload one or more specific connections).

Turning now to FIG. 2b, an IPSec chimney 210 may be layered below or on top of other chimneys. For example, an IPSEC chimney 210 may be layered on top of or below a TCP chimney 220. The switch 222 is used to offload the processing unit 120 from performing network stack operations for the intermediate software layer(s) 206. While the switch 222 is shown separately, it should be noted that the switch 222 may be integrated into the top intermediate layer of the network stack 202. After offloading the network stack operations, data is sent to the peripheral device 204 via either chimney 210 or 220, depending on the type of network stack 202 being used, for the peripheral device 204 to perform network stack operations. For example, if the TCP connection is not offloaded, or another transport protocol (such as UDP) is being used, IPSec operations are sent to the periphery device 204 via chimney 210 to perform IPSec operations. Similarly, TCP operations are sent to the peripheral device 204 via chimney 220 if the TCP connection is offloaded. If the TCP connection requires IPSec encapsulation/de-encapsulation, the offload target (e.g., the peripheral device) will apply the IPSec SA offload object to the packet. In this hierarchy, the intermediate software layers and IPSec operations do not have to exclusively reside in the host or the peripheral device and it allows any of the intermediate layers to either be completely offloaded, to remain in the host, or a combination of both (e.g., offload one or more specific connections).

A connection may be any combination of reliable and unreliable data transfer and unicast or multicast data transfer. If an intermediate layer remains in the host, the host updates cached variables (as described below) in the peripheral device 204. For example, a transport control block (TCB) state entry for a connection can be offloaded for the transport layer with a route cache entry (RCE) for the network layer offloaded to the peripheral device 204. The switch 222 continues to send traffic for a different TCB through the network stack 202 that shares the same RCE while the switch 222 sends traffic through the chimney 220 for the offloaded TCB. The IPSec switch 208 sends traffic for offloaded IPSec functions for an offloaded security association (SA) through chimney 210 and can transmit/receive traffic from chimney 220 for the traffic that requires IPSec authentication and/or encryption/decryption.

The switch 208 (or 222) initiates the offload by sending the intermediate layer 206 an offload request. Each intermediate layer 206 either refuses the offload request or adds resource information to the offload request and sends the offload request to the adjacent software layer in the network stack 202. The offload request includes resource information (potentially for each network layer) that helps the peripheral device 204 decide whether it can successfully offload the connection. When the peripheral device 204 receives the offload request, it calculates whether it has resources available to offload the connection and/or IPSec operation. The peripheral device 204 refuses the offload request if the offload is not possible. Otherwise, the peripheral device 204 accepts the offload request and allocates resources for the connection. The peripheral device 204 completes the offload request by sending a completion message having a list of parameters to the intermediate software layer(s) 206. The list of parameters provides information to the intermediate software layer(s) 206 and switch 208 (or 222) to allow the intermediate software layer(s) 206 and switch 208 (or 222) to communicate with the peripheral device. As each intermediate software layer 206 receives the completion message, it removes information for its layer from the list of parameters and passes the remainder of the completion message to the next intermediate layer 206, or if there are no additional intermediate layers 206, to the switch 208 (or 222).

Either when an intermediate layer 206 receives the completion message for offloading or during the original offload request, the intermediate layer 206 passes its state to the peripheral device 204. Each state may have three types of variables (also referred to as "state variables"): CONST, CACHED, and DELEGATED. A state object corresponding to any given intermediate layer 206 may have all three types of states, or a subset of the three types of states. CONST state variables are constants that never change during the life of the offloaded connection.

The CONST state variables are provided to the peripheral device 204 when offloading processing control of the network stack and/or IPSec operations (hereinafter also referred to simply as "during offload"), but are not returned by the peripheral device 204 back to the appropriate intermediate layer 206 when the state object is uploaded to the host protocol stack (hereinafter also referred to as simply "during upload"). This is because the intermediate layer 206 retains the values for the CONST state variables, thus allowing the data structure passed during upload to be much smaller.

The host processor maintains ownership of CACHED state variables and ensures that any changes to a CACHED state variable(s) in the host processor are updated in the peripheral device 204. Control messages that change the CACHED state variables are handled by the network stack 202. As a result, the host will write CACHED state variables to the peripheral device during offload, but during upload it does not need to read CACHED state variables back from the peripheral device during upload. This further reduces the overhead associated with an upload.

The host processor transfers ownership of DELEGATED state variables to the peripheral device 204. The DELEGATED state variables are written once during offload and are read back during upload. By only transferring back control of the DELEGATED state variables, the overhead associated with uploading the connection back to the host is minimized.

Accordingly, during offload, control of state objects is shared between the host processor and the peripheral device 204 in that control of some of the state variables of a given state object is retained within the host processor, while control of other state variables of the given state object are passed to the peripheral device 204. Therefore, control for processing of state associated with each intermediate layer is cleanly divided between the host processor and the peripheral device such that each owns an exclusive portion of the state.

The host processor can query the peripheral device 204 for DELEGATED state variables when needed. The host processor may also query CONST or CACHED state variables for diagnostics. Dividing the state into three categories (or "variables") enables the network stack 202 to coexist cleanly with the chimney 210, 220. Any state variables that are to be given to the peripheral device (whether or not control over such state variables is also passed to the peripheral device) may be included in the initial offload request to optimize the number of interactions between the peripheral device and host stack. This can be done if either the state object does not contain a delegated state or the host stack can ensure that the delegated state variables will not change between the initial offload request and the completion of the offload request.

An upload can be initiated by either the peripheral device 204 or the host stack 202. The host stack's initiation of an IPSec operation can be originated by a layer above the IPSec layer 214 or by the IPSec layer 214 itself. The upload for a network stack operation can also be indirectly initiated by an intermediate layer 206 because, for example, the intermediate layer 206 invalidated a path or neighbor entry. Once the upload is initiated, the peripheral device 204 completes all outstanding requests and hands the state objects back to the host stack. The switch 222 queues any further transmit requests and stops posting receive buffers to the peripheral device 204. During the upload the intermediate layers of the host stack regain control of the state object(s), and finish the upload request. After the upload request has completed, the peripheral device 204 then frees resources that are no longer being used due to the upload.

Under some situations, data for a specific connection or state object may arrive through another peripheral device or may be required to be processed by the host protocol stack (for example, IP fragments, processing of IP options or extension headers, or route flaps which cause a TCP segment to arrive on a different network interface). If this occurs, an intermediate layer 206 may also have a forwarding interface to forward the received data to the peripheral device 204. An intermediate layer 206 may attempt to forward data to the peripheral device 204 while the peripheral device is in the middle of uploading the associated connection or state object. Thus the peripheral device 204 may no longer have control of the state object necessary to process the data packets. If this occurs, the peripheral device 204 returns an error message to the intermediate layer 206 indicating an upload is in progress. The error message informs the intermediate layer 206 to stop forwarding incoming data and to buffer further data until the intermediate layer receives the state object. Alternatively, at the expense of additional buffer memory on the peripheral device 204, the incoming data could be forwarded to the peripheral device 204 for the peripheral device 204 to buffer the data and provide the data when the uploading of the state object has completed. Alternatively, if the intermediate layer 206 is aware that an upload is occurring, the intermediate layer may choose to buffer the request until the upload has completed and then process the data.

Multiple connections may be off-loaded by an intermediate software layer 206 to the peripheral device 204. A reference counter is maintained by the intermediate software layer 206 of the number of upper layer state objects (i.e., state objects of layers above the intermediate software layer 206) which reference the intermediate software layer's state object for offload. A state object as used herein is a collection of state variables (also referred to as "states") for a particular layer. As previously mentioned, such state variables may be categorized as CONST, CACHED, or DELEGATED. If the number of references to a specific intermediate layer's offloaded state object is decremented to zero (for example, during an upload request), the intermediate layer 206 sends a message to the peripheral device 204 to upload the state object for the intermediate layer, send corresponding delegated state variables to the intermediate layer 206 and delete the state object for the intermediate layer 206. Note that the upload request may occur during the original upload request that caused the reference count to be decremented to zero, or at a later time.

Figure 3B:
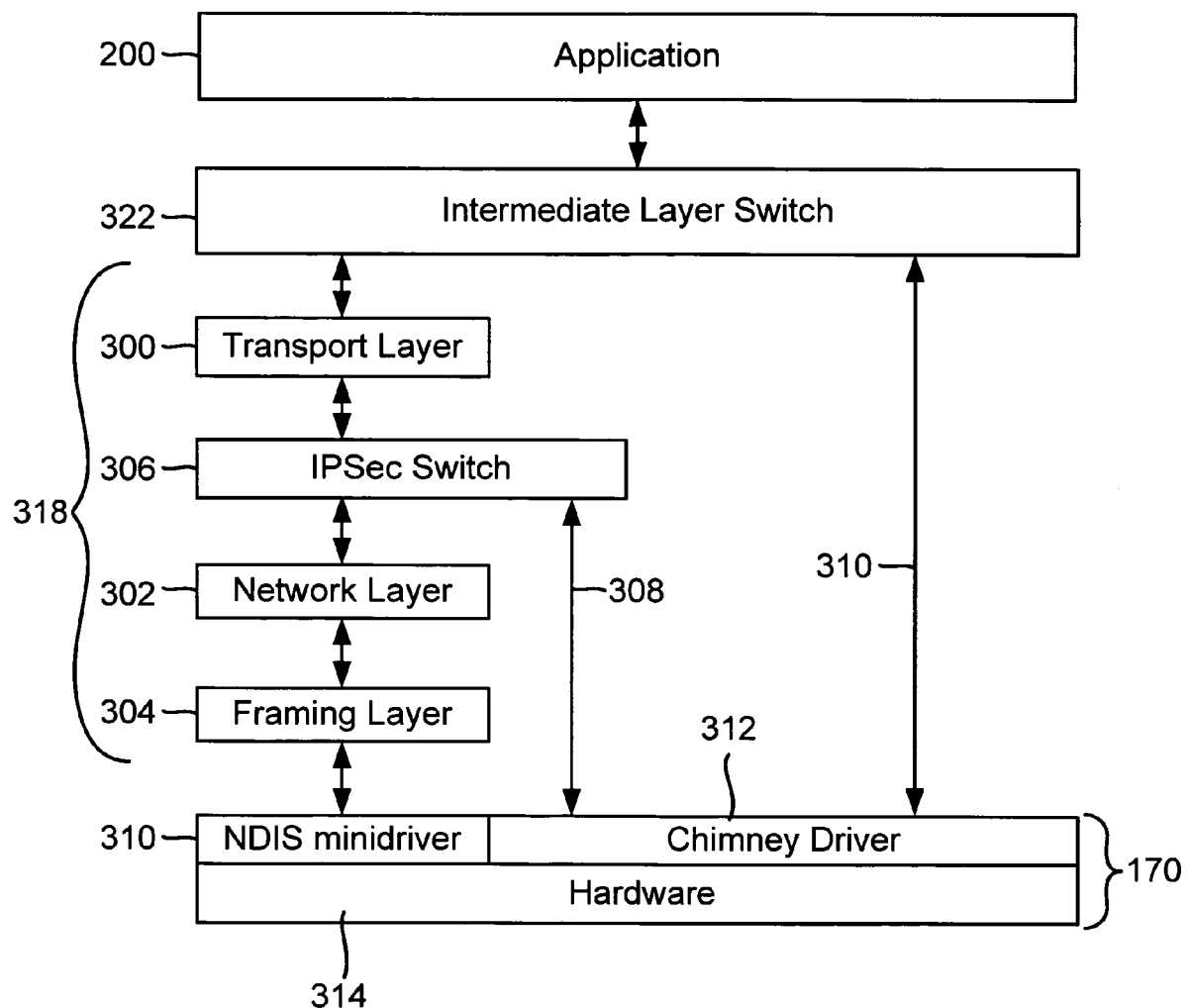
FIG. 3b is a block diagram illustrating the functional layers of the NDIS path with the IP security bypass path embedded in another offload chimney in accordance with the present invention.

FIG. 3a describes an embodiment in accordance with the present invention where the hardware layer 314 includes a peripheral device that may be, for example, a Network Interface Card (NIC). FIG. 3b describes an embodiment in accordance with the present invention where the hardware layer 314 includes a peripheral device that may be, for example, a Network Interface Card (NIC) and the IPSec chimney 308 is embedded in another chimney 320 such as a TCP Chimney. In addition, FIG. 3a illustrates a software layer that includes an IPSec switch 322 and a network stack 318 that comprises a Transport Layer 300, a Network Layer 302, and a Framing Layer 304. The Network Layer 302 is also known as a "Path Layer" and the Framing Layer 304 is also known as a "Neighbor Layer".

In general, an application 200 sends networked messages through network stack 318 to the peripheral device (e.g., hardware 314) during operation. Data sent from the application 200 travels through the transport layer 300 and to IPSec switch 306, which controls whether the data goes down the host based network stack 318 or the IPSec chimney 308. Transport layer 300 may be a TCP layer, a UDP layer, an ICMP layer and the like. Note that the switch 306 may be incorporated into a layer of the network stack 318. The software layers in the network stack 318 receive data from the application 300, package the data in a packet form, and send the resulting packets to the peripheral device hardware 314 via NDIS minidriver 310. The software layer also provides the opposite functionality when a network packet is received as it hands the payload to the application. Other tasks the network stack 318 may perform as a data packet passes through the stack 318 includes data encryption and decryption for security associations that have not been offloaded, reliable data transmission, and calculation or checking of a message digest (e.g., checksum or CRC for the data packet). Many of these tasks are performed by the host processor if not offloaded and are processor intensive.

Turning to FIG. 3b, an application 200 sends networked messages through network stack 318 to the peripheral device (e.g., hardware 314) during operation. Data sent from the application 200 travels through the TLI (Transport Layer Interface) switch 322, which controls whether the data goes down the host based network stack 318 or the chimney 320. Note that the TLI switch 322 may be incorporated into the top layer of the network stack 318. The software layers in the network stack 318 receive data from the application 200, package the data in a packet form, and send the resulting packets to the peripheral device hardware 314 via NDIS minidriver 310. The software layer and network stack 318 perform the same functions as previously described.

The TLI switch 322 is used to offload stack operations from the CPU to the peripheral device by sending data for offloaded connections to the peripheral device via chimney 320 and chimney driver 312. One skilled in the art will appreciate after reading the specification and claims that the NDIS driver 310 and the chimney driver 312 may be the same actual driver. Those skilled in the art will also recognize that the upper edge of NDIS minidriver 310 and chimney driver 312 is the NDIS API in the MICROSOFT® WINDOWS® operating systems. For purposes of explanation, a Secure Internet Protocol underneath a Transmission Control Protocol (TCP) based protocol stack will be used to explain the invention. However, one of ordinary skill in the art will appreciate after having reviewed this description that many types of peripheral devices may be used and other network stacks may be offloaded using the principles in accordance with the present invention. Additionally, the invention may also be used to offload higher function protocols such as the internet Small Computer System Interface (iSCSI), the Network File System (NFS), or the Common Interface File System (CIFS). The offloaded protocol may be connection-oriented (e.g., TCP) or connectionless (e.g., IPSEC or UDP).

There are many reasons for performing a network connection offload. By way of example, and not limitation, some of the reasons are provided below. A system administrator could select a specific service to be offloaded. A specific connection may be offloaded if traffic (in terms of number of bytes or packets) is consuming a significant amount of resources. In addition, certain types of services in addition to IPSec services may be offloaded. In addition, administrative policies may drive processing offloads. For example, an administrator may have a policy that all connections from within an organization are offloaded first or all connections for a specific application are offloaded first. System resources (e.g., CPU utilization, data cache use, page table cache use, memory bandwidth) being used may lead the host processor to offload connections.

Figure 4:
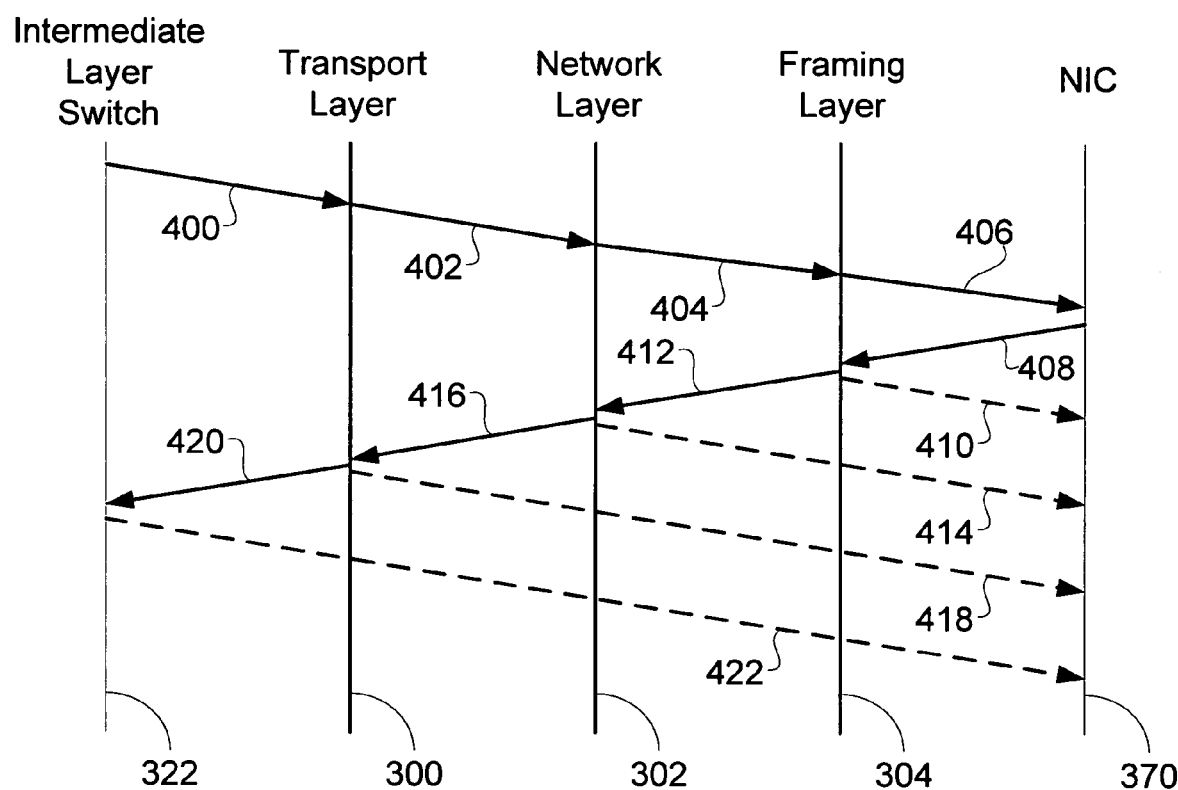
FIG. 4 is a ladder diagram illustrating an offload mechanism in accordance with the teachings of the present invention.

Prior to describing the steps to offload IPSec functions, the steps to offload a TCP connection shall first be described. FIG. 4 illustrates a three step process taken to offload a TCP connection, where the application layer 200 in FIG. 3b is not shown, but would be to the left of TLI switch 322. In addition, the peripheral device 370 is shown in FIG. 4 as a NIC simply for purposes of illustration, though other types of peripheral devices could perform the same or similar function in accordance with the present invention, including a general purpose CPU with a network adaptor. In general, FIG. 4 illustrates that the process allocates resources required to offload the TCP connection, provide handles to each of the layers (i.e., transport layer 300, network layer 302, framing layer 304) and switches 306, 322 and offloads the state for each of the layers 300, 302, 304 to the peripheral device 370. During the offload transition, the TLI switch 322 buffers all messages sent or received from/to the application. Alternatively, the Transport Layer 300 buffers the data. When the offload is complete, the buffered data is transferred to the peripheral device 370. When incoming packets are received during the offload transition, the peripheral device 370 continues to move the data up through the layers 300, 302, 304 and switches 306, 322 until the Transport Layer delegated state is handed to the peripheral device 370. If the Transport Layer 300 received incoming packets during the offload transition, it will forward the data to the NIC 370 as part of the transport state object delegated state or separately.

The TLI switch 322 initiates the offload by sending the Transport Layer 300 an offload request 400. The offload request includes a pointer to the next layer's local state (e.g., a TCB pointer for Transport Layer 300, an RCE pointer for Network Layer 302, an ARP entry pointer for the Framing Layer 304 or an NDIS miniport pointer for the NDIS minidriver 310). The offload request also includes the offload type (e.g., TCP for TLI switch 322, IPv6 for Network Layer 302, and so forth), and resource information that helps the peripheral device 370 decide whether it can successfully offload the TCP connection. The TLI switch 322 may also provide an offload handle to the peripheral device 370. The TLI switch 322 will stop sending application send or receive buffers to the Transport Layer 300 and will queue them and wait for the Transport Layer 300 to send a completion message 420.

The Transport Layer 300 either refuses the offload request or sends an offload request 402 to Network Layer 302 with TCP resource information added to the TLI switch resource information. The Transport Layer 300 may also provide an offload handle to the peripheral device 370. If there are any outstanding application send or receive buffers pending, the Transport Layer 300 returns the buffers to the TLI switch 322.

The Network Layer 302 receives the offload request 402 and either refuses to offload the connection or sends an offload request 404 to the Framing Layer 304 with network resource requirements added to the TCP resource information and the TLI switch resource information. The Network Layer 302 may also provide an offload handle to the peripheral device 370.

The Framing Layer 304 either refuses to offload the connection or sends an offload request 406 to the peripheral device 370 with framing resource requirements added to the network resource requirements, the TCP resource information and the TLI switch resource information. The Framing Layer 304 may also provide an offload handle to the peripheral device 370.

The peripheral device 370 receives the offload request and calculates whether it has resources available to offload the TCP connection. If the NIC decides the offload is not possible, it refuses the offload request. If the NIC decides the offload is possible, it accepts the offload request and allocates resources (e.g., TCB, route cache entry (RCE), address resolution protocol (ARP) table entry (ATE)) for the connection. The peripheral device 370 creates a linked list of parameters and dispatch tables to hand to the layers 300, 302, and 304 and completes the offload request by sending a completion message 408 having the linked list of parameters to the Framing Layer 304. The parameters include an offload handle and dispatch table for each of the layers 300, 302, 304.

As used herein, an offload handle means a mechanism to allow a software layer to communicate with the peripheral device or a peripheral device to communicate with a software layer. By way of example and not limitation, an offload handle may be a pointer-based handle, an integer value used as a lookup into an array, a hash table (e.g., a hashing function), a communication channel between the software layer (or network stack) and the peripheral device, or a set of parameters passed down by a software layer that the peripheral device uses to look up the state object.

By way of example and not limitation, the mechanism to communicate between the intermediate software layers (300, 302, and 304) and the peripheral device 370, referred to as a dispatch table, can be a function call pointer, used as a lookup into an array, a hash table (e.g., a hashing function), a communication channel between the software layer (or network stack) and the peripheral device, or a set of parameters passed down by a software layer that the peripheral device uses to look up the state object. The dispatch table could be exchanged during peripheral device initialization or at a later time.

The dispatch tables are used to send data directly to the peripheral device 370 or receive data directly from the peripheral device 370. The dispatch tables can also be used to provide diagnostics. For example, a software layer could be inserted between two intermediate layers or between the bottom most intermediate layer and the peripheral device to monitor the system and inject faults to make sure the system is functioning properly. Additionally, the dispatch table can be patched by software layers that can add additional functionality if needed. For example, a software layer could be added to provide the functionality of a filter driver or a virtual peripheral device. Patching is typically done by overwriting the dispatch table with function pointers for the inserted intermediate layer. Then when the function pointer for the inserted intermediate layer is called and the inserted intermediate layer has finished its work, the inserted intermediate layer calls the original function pointer from the original dispatch table.

When the Framing Layer 304 receives the completion message, the Framing Layer 304 stores the offload handle and dispatch table for the Framing Layer in its ARP Table Entry for easy updates (e.g. the destination MAC address changes or the encapsulation type changes). The Framing Layer 304 then updates 310 the peripheral device 370 with the state associated with the ATE. The Framing Layer 304 removes its state from the linked list and forwards (as indicated by arrow 412) the remaining information in the linked list to the Network Layer 302.

The Network Layer 302 stores the offload handle and dispatch table for the Network Layer 302. The Network Layer 302 then updates (as indicated by arrow 414) the peripheral device 370 with the state associated with the RCE. The Network Layer 302 removes Network Layer information from the linked list and sends a completion message (as indicated by arrow 416) having the linked list of parameters and dispatch tables to the Transport Layer 300. The Network Layer 302 may forward any buffered IP fragments it received during the offload to the peripheral device 370 for processing or it may process the IP fragments in the Network Layer and forward them to the Transport Layer 300.

The Transport Layer 300 stores the offload handle for the Transport Layer and sends (as indicated by arrow 418) its state to the peripheral device 370. The Transport Layer then sends the completion message 420. In an alternate embodiment, the Transport Layer and the TLI switch are the same layer and message 420 is not needed.

In an alternate embodiment, the layer's state object is sent with the offload request. For example, the Framing Layer state object, Network Layer state object, and Transport Layer state object is sent with the offload request, and only updated if the cached state changes between the offload request and the completion event. The entire layer state object can only be sent with the offload request if the delegated state is either not present or cannot change between the offload request and the completion of the offload request. If a message is received that would change DELEGATED state during the offload sequence, that message will not generally be processed (should be buffered), and when the offload completes, the message must be forwarded to the offload peripheral device for processing. However, state variables classified as CACHED may be sent with the offload request and may change between the offload request and the completion of the offload request. If this occurs, changes in the CACHED state change must be recorded, and when the offload completes, the CACHED state must be updated in the peripheral device.

Once the TLI switch 322 receives the completion message 420, the TLI switch 322 transfers (as indicated by arrow 422) the application send and receive buffers to the peripheral device 370. The TLI switch 322 uses the dispatch table to post all outstanding and future receive buffers and sends to the NIC 370 for processing. During the time the offload request takes to complete, each layer 300, 302, and 304 either refuses new offload requests for the offloaded state object (i.e., the state object associated with a layer) or queues them until the offload is complete. In an alternate embodiment, the application buffers are handed down in the initial offload request.

The Transport Layer 300 may still have the ability to process incoming TCP data and hand the TCP payload to the TLI switch 322 if the transport state object was not offloaded to the peripheral device 370 in the initial offload request 402. If incoming TCP data arrives through the network stack 318 after this time, the incoming data is forwarded to the peripheral device 370 to be processed by the peripheral device.

On subsequent offload requests which reference previously offloaded state, the Network Layer 302 and the Framing Layer 304 pass the offload handles they received from the peripheral device 370 from the prior offload to the peripheral device 370. This signals to the peripheral device 370 that the peripheral device 370 has already allocated resources for the Network Layer 302 and Framing Layer 304, which conserves peripheral device 370 resources and speeds up the offload.

As indicated previously, the layers 300, 302, 304 pass their state to the peripheral device 370. Each state has three types of state variables: CONST, CACHED, and DELEGATED. CONST state variables are, as implied by name, constants that never change during the life of the offloaded connection. Thus, the host will not need to read CONST state variables back to the layers when the connection is terminated. Similarly, the host processor maintains ownership of CACHED state variables and ensures that any changes to a CACHED variable in the host processor are updated in the peripheral device 370. As a result, the host will write but never read back the CACHED state variables (unless system diagnostics requests it). The host CPU, therefore, transfers ownership only of DELEGATED state variables to the peripheral device 370. The DELEGATED state variables are written one time when the offload occurs, and are read back when the offload is terminated. Since the peripheral device (e.g., NIC) only needs to transfer back the DELEGATED state variables, the overhead of transferring the connection back to the host is minimized. Furthermore, the host CPU queries the peripheral device 370 for DELEGATED state variables only when needed (e.g., for statistics).

The CONST state variables for the Transport Layer 300 can include the destination port, the source port, one or more flags to control transport layer behavior (e.g. whether window scaling is enabled or SACK is enabled), SEND and RECV window scale factors, the initial maximum segment size advertised by the remote endpoint (Remote MSS), and potentially other parameters. As already described herein, the value of each such aforementioned TCP CONST variable is constant—its value does not change during the life of a TCP connection.

The CACHED state variables for the Transport Layer 300 can be TCP state variables and IP state variables. IP state variables may be required in the transport structure if the implementation enables the network layer values to be overwritten on a per connection basis. These CACHED state variables can include one or more flags (e.g. whether the "Nagle" algorithm, or whether TCP "Keep-Alives" are enabled) as well as the "Keep-Alive" settings (i.e., interval, number of probes, and delta), Effective Maximum Segment Size (or Effective MSS), initial default receive window (InitialRcvWnd), the number of bytes to be copied in the receive indicate by the peripheral device 370, Type of Service (TOS) that prioritizes packets according to traffic types for IPv4, and finally traffic class and flow label to enable IPv6 packets to be prioritized in the network.

The DELEGATED state variables can include current TCP state as specified in the Internet Engineering Task Force (IETF) RFC 793, one or more flags (e.g. was the connection abortively closed by the remote peer), a sequence number for the next expected TCP receive segment (i.e., RCV.NEXT), receive window size (RCV.WND), the sequence number for the first Un-Acknowledged Data (SND.UNA), the sequence number for next TCP segment to be sent (SND.NEXT), the send window size (SND.WND), the segment sequence number used for the last window update (SndWL1), the segment acknowledgement number used for the last window update (SndWL2), the maximum sequence number ever sent (SND.MAX), the Maximum Send Window (MAX_WIN), and the current Congestion Window (CWnd).

The DELEGATED state variables can further include, a Slow Start Threshold (SSTHRESH), the smoothed round trip time (SRTT), the round-trip time variation (RttVar), the timestamp value to send in the next TCP ACK (TsRecent), how long ago the most recent timestamp was received (TsRecentAge), how many ACKs have been accepted for the same sequence number (DupAckCont), the number of keepalive probes that have been sent (KeepAlive ProbeCount), the time remaining until the next keepalive timeout (KeepAlive TimeoutDelta), the number of retransmits that have been sent (KeepAlive Count), the time remaining until the next retransmit timeout (Retransmit TimeoutDelta), and a pointer to buffered receive data (BufferedData—TCP data that was received while the offload or upload was in progress).

The CONST state variables for the Network Layer 302 may include the destination IP address (for either IPv4 or IPv6) and the source IP address (for either IPv4 or IPv6). The CACHED state variables for the Network Layer 302 may include the path maximum transmission unit (PathMTU). The DELEGATED state variables for the Network Layer 302 may include the IP Packet ID start value. The CACHED state variables for the Framing Layer 304 may include the destination Media Access Control (MAC) address, the source MAC address, parameters for IETF RFC 2461 Neighbor Discovery (Host reachability delta and NIC reachability delta) and a flag to indicate the format of the header (e.g., LLC/SNAP (Logical Link Control/Sub-Network Access Protocol) format or DIX (Digital, Intel, Xerox) format).

The Transport Layer state may includes a handle for the Network Layer state object and the Network Layer state may includes a handle for the Framing Layer state object because the Network Layer (also referred to as "Path") state can be shared between multiple connections and the Framing Layer (also referred to as "Neighbor") state can be shared between multiple paths (e.g., all traffic going through one router). This hierarchy is maintained for several reasons. A connection may require a NIC handle for the Network Layer because the IP ID namespace may be managed across all offloaded connections on a per path basis or because an update of the Path MTU can be done once at the Network Layer and effect all TCP connections, rather than individually setting it for each TCP connection. A path requires a NIC handle for the Framing Layer state object because a route update could change the next hop address, thus pointing to a new MAC address. The hierarchy also condenses the amount of state required to be maintained by the NIC. For example, an ARP update for IPv4 could change the mapping from an IP address to a MAC address (e.g., an interface failed over on the server). The host maintains the MAC address as a cached variable, thus it only needs to do a single update of the cached state and all connections are failed over to the new interface.

Once the host has offloaded a TCP connection, the peripheral device 370 is responsible for assigning packet identifiers (e.g., IP IDs) for the packets it sends. IP ID is offloaded on either a per interface basis or a per layer state object basis. In either case, the peripheral device 370 is assigned a portion of the IP ID namespace. In one embodiment, the peripheral device 370 is assigned half of the total IP ID namespace when it is initialized, and the host protocol stack maintains its portion of the IP_ID namespace on a per peripheral device basis. Another embodiment enables the host protocol stack to maintain the IP_ID namespace on a per path basis. The peripheral device is given an IP packet ID start value to use when the network state object is passed to the peripheral device 370. The peripheral device 370 can use the following formula to generate an IP ID on IP packets it sends:

Cur_IPID=[(Start_IPID_For_This_Path)+(Counter_ For_This_Path)mod32K]mod 64K
Counter_For_This_Path=Counter_For_This_Path+1

Alternatively, the peripheral device can be statically assigned half the namespace.

If an embodiment is used that dynamically transfers the IPID start address to the peripheral device 370, then when the offloaded connection is either uploaded or invalidated, the peripheral device 370 transfers the next IPID value it would use to the Network Layer to store for the next offload that occurs and the host processing unit continues to use the portion of the IP ID namespace it was assigned. The host processing unit could use the full IP ID name space, but preferably only after the maximum lifetime of the IP packets on the network has been exceeded.

If the peripheral device 370 is removed from the system, the last value used by the peripheral device needs to be retained in case the peripheral device 370 is re-inserted into the system within the maximum packet lifetime. If the peripheral device 370 is inserted after the maximum packet lifetime, the last value does not need to be retained The peripheral device 370 places data into receive buffers in the order the data is received and fills application buffers in the order they are posted for the offloaded connection. Many applications wait for a receive indication before posting a receive buffer. In one embodiment, the peripheral device 370 has a global pool of buffers to use if data arrives for a connection and no application receive buffers have been posted. The global pool of buffers is used across the offloaded connections and may be used to implement: 1) handling of out-of-order TCP transmissions; 2) de-fragmenting IP datagrams; 3) a buffer copy algorithm rather than a zero copy algorithm if the application is posting buffers that are too small for a zero copy algorithm; and 4) an indicate mechanism to indicate data to the application when the application has not preposted buffers. Alternatively, a per-connection pool of buffers may be used if efficient use of buffer resources is not a concern. In this case, the global pool of buffers is only used if the application did not pre-post buffers or for lack of system resources (e.g., not enough resources to pin the application buffer in memory).

Figure 5A:
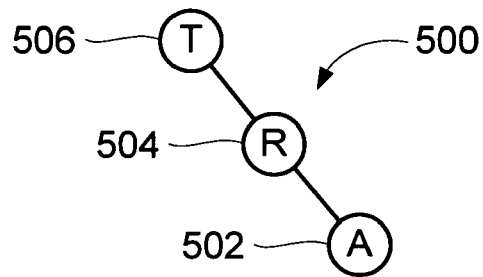
FIGS. 5A-5D are object diagrams illustrating an inverted tree with respect to intermediate software layer state objects.

Turning now to FIGS. 5A-5D, a typical peripheral device (e.g., a NIC) that has received an offload may have an inverted tree data structure 500, which is representative of the offload. In the figures, dotted lines represent new states allocated by the peripheral device. In FIG. 5A, the peripheral device has an ARP entry 502 coupled to a route cache entry 504 that is coupled to a network connection as a TCP entry 506. If, for example, all network connection (e.g., TCP) traffic is going to a router, the next hop will always be to the same ARP entry 502. If the route cache entry 504 is to be used for the next network connection offload, the only new resource is the new offloaded TCP state object. Thus when the host CPU initiates an offload down the network protocol stack, the intermediate software layers that have already offloaded their state (e.g. Network Layer 302 and Framing Layer 304) would simply insert the peripheral device generated offload handle that was allocated on the previous offload request. The peripheral device 170 only has to allocate new resources (e.g. TCP entry 508) and send offload handles for the new resources back up the network protocol stack.

Figure 5B:
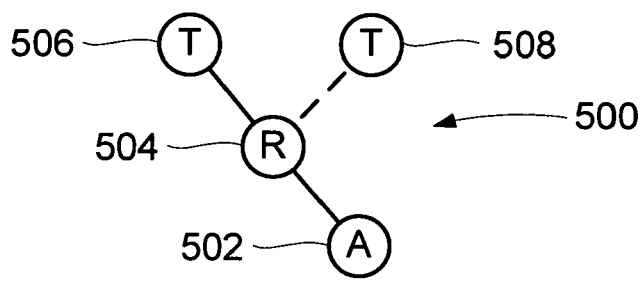

The inverted tree 500 now has TCP entry 508 coupled to the route cache entry 504 (see FIG. 5b). This approach saves peripheral device resources and speeds up the offload. Additionally, if a cached variable state changes, only a single structure needs to be updated. If all state for the various software layers in the chimney were offloaded as a single entry, any state update below the top software layer would require multiple updates.

Figure 5C:
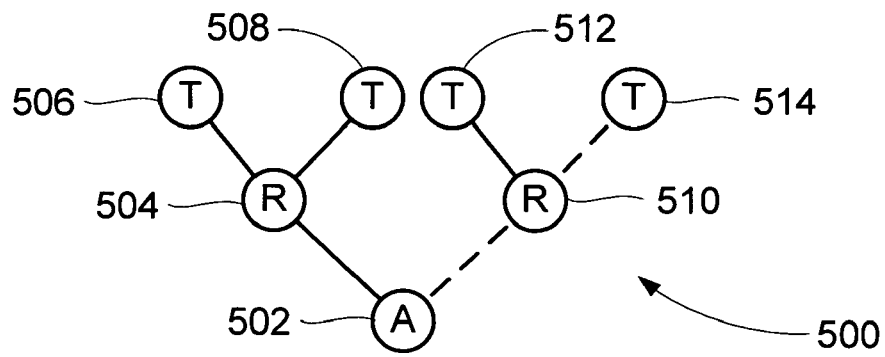
Figure 5D:
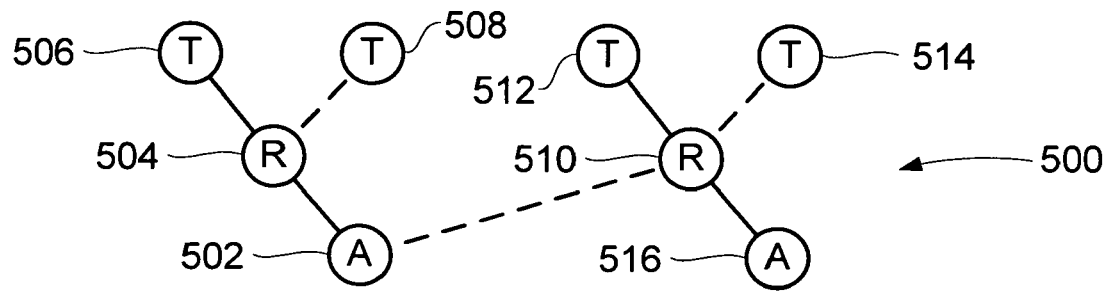

FIG. 5C shows the inverted tree 500 with a more complex configuration. There are two route cache entries, 504 and 510, that go through ARP table entry 502. TCP network connections 506 and 508 utilize route cache entry 504. TCP network connections 512 and 514 reference route cache entry 510. If any ARP update occurs (e.g., a multi-homed server's interface fails over using a gratuitous ARP update), only entry 502 must be updated. This enables potentially thousands or hundreds of thousands of connections to be failed-over to a new interface with only a single update to the peripheral device required. FIG. 5D shows two independent inverted trees (entries 502-508 and entries 510-516) merged into a single inverted tree 400 after a route update occurs. Before the route update, the next hop ARP entry for route cache entry 510 is ARP table entry 516. After the route update, the next hop ARP table entry is ARP table entry 502. Thus, the use of an inverted tree enables route updates to be processed much more efficiently, rather than thousands or tens of thousands of updates if the state for the framing layer, network layer, and transport layer were offloaded as a single entry. Importantly, the inverted tree concept can be extended to offload multiple connections at a time.

Figure 6A:
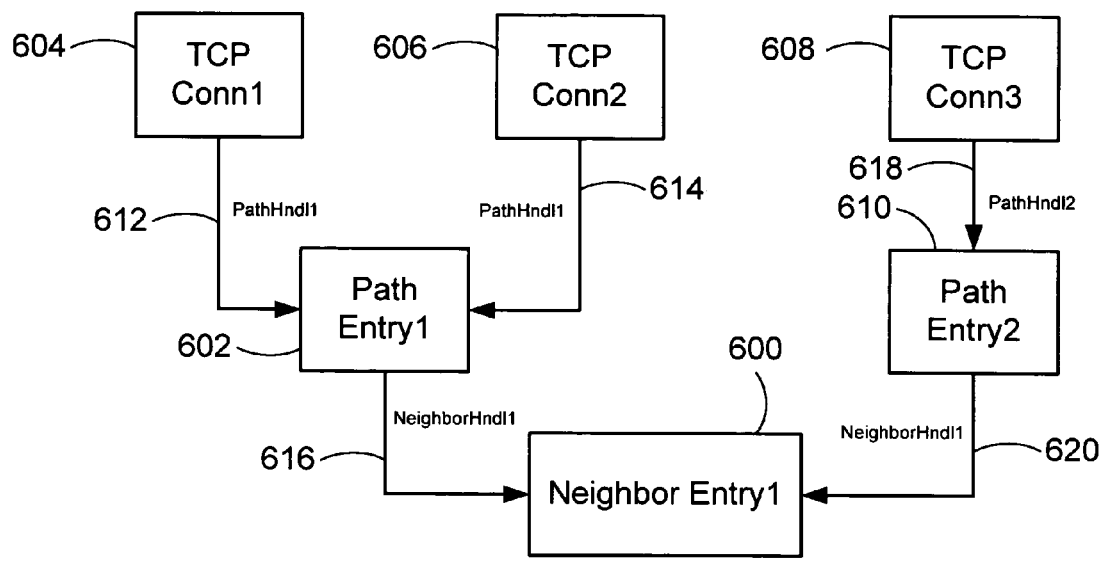
FIGS. 6A-6B are block diagrams illustrating an inverted tree in accordance with the present invention with respect to a collection of block pointers.
Figure 6B:
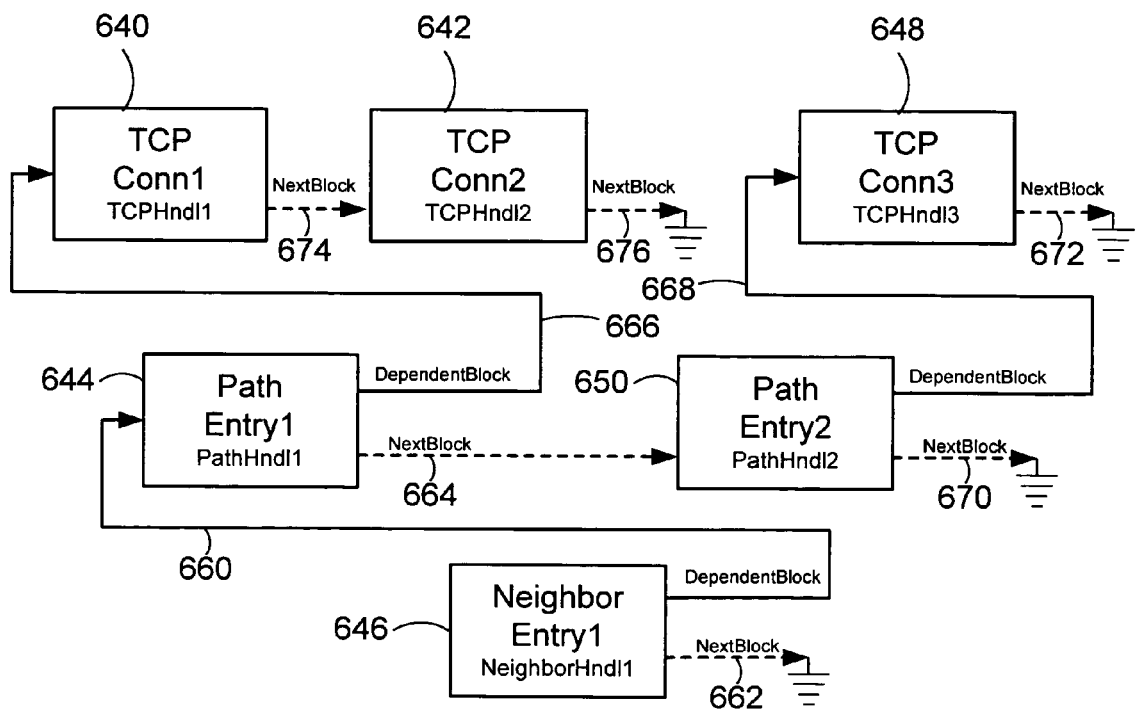

FIGS. 6A and 6B illustrate an additional feature in accordance with the invention with specific reference to a block list handle (or "block list"). In general, a block list is a data structure that is given to an offload target (e.g., a peripheral device) during Chimney Offload or Chimney Termination. Thus, the component that is processing a network connection sends the block list back to the host in the case of "upload", and down to the peripheral device in the case of "offload" so that the initial point of reference is arbitrary. The block list data structure comprises a series of pointers that point to specific next layer state object (Dependent Block) or to state objects at the same layer (Next Block).

More particularly, a Dependent Block pointer points to the next level up in the hierarchy and is used to inform the offload target of any existing dependencies between intermediate software layers in the network protocol stack. For example, a Neighbor (or Framing Layer) state object will be dependent on a Path (or Network Layer) state object, which may be dependent on the TCP connection of the same hierarchy. A Next Block pointer, however, points to a data structure that is at the same level in a different hierarchy. For example, a Path (or Network Layer) state object in a first TCP connection may point to a Path state object in a different TCP connection.

FIG. 6A illustrates an inverted tree data structure, as similarly shown in FIGS. 5A-5D. The inverted tree of FIG. 6A shows two TCP connections 604 and 606 (i.e., TCP Conn1 and TCP Conn2) that have different TCP layer state entries, but a common Path (or Network Layer) state entry 602, and common Neighbor state entry 600. A different network connection 608 (i.e., TCP Conn3), however, has a separate Path state entry 610, but a common neighbor state entry 600. The entire sequence hierarchy can be defined between each software layer by a series of path handles that direct the connection to the next software layer. For example, path handles 612 and 614 direct TCP state entries 604 and 606 respectively to Path state entry 602, which in turn has a handle 616 directing it to Neighbor state entry 600. Similarly, TCP state entry 608 has a handle 618 that points to a Path state entry 610, which in turn is directed to common Neighbor state entry 600 via handle 620. In accordance with the present invention, FIG. 6A can also be expressed in terms of Next block pointers, to thereby include multiple network connection chimneys at once.

FIG. 6B illustrates how the block list handle (collection of various Next and Dependent block pointers) relates several network connection blocks among different network connections for simultaneous offload. As in FIG. 6A, FIG. 6B denotes the inverted tree in terms of software layer blocks that include the various software state handles. Shown are TCP blocks 640 and 642 with a common Path block 644, and a common Neighbor block 646. A third TCP block 648 has a Path block 650 and the same Neighbor block 646. The block list handle would state that Neighbor block 646 include a Dependent Block pointer 660 that points to Path block 644. In contrast with the prior inverted tree of FIG. 5A, however, the Neighbor block 646 may also point to another inverted tree data structure through Next Block pointer 662. If the Next Block pointer 662 is missing (e.g., a NULL value), this may signal in the block list that there are no other inverted trees at that layer of the inverted tree. Similarly, Path block 644 has a Next Block pointer 664 that points to Path block 650, an entirely different connection "branch" of the inverted tree.

As in the case of the Neighbor block 646, both Path blocks 644 and 650 each have Dependent block pointers 666 and 668 respectively, and a Next Block pointer 664 and 670 respectively, such that Path block 650 may also point to a different connection Path of an entirely different inverted tree (e.g. 672). In addition, each of the TCP blocks 640, 642, and 648 have Next Block Pointers 672, 674 and 676 that may point to another TCP block in the same inverted tree (e.g., 674), or may indicate that there are no more blocks in the this tree (e.g. 672 and 676). These pointers are not, however, static. That is, the links may change such as if a route for a path changes, it may change the next neighbor to a different route. In that case, for example, Path block 650 might change the neighbor state entry it uses from Neighbor Entry 1 646 to some other neighbor, (e.g. Neighbor Entry 2 (not shown)). Accordingly, the use of a block list enables multiple connections, paths, and neighbor entries to be offloaded or terminated in a single program call.

By way only of example and not of limitation, a first offload request might require the offload target (e.g., a NIC) to allocate state and a handle for each of the data structures (e.g., 640, 642, 644, 646, etc.), and return the offload target's handle to the host network protocol stack. An alternate embodiment is that the offload target allocates state on a per TCP connection basis, and replicates all of the dependent path and neighbor state into the TCP connection state. The offload target then allocates a state structure for the path entry, but initializes the state with a pointer to each TCP state that contains a copy of the path state. A similar routine could apply to the neighbor state. This allows all state used for data transfer to be contained within a single data structure, thereby making the number of state lookups reduced for sending data. For example, for the TCP block 640 send packet processing, the number of state lookups is reduced from three to one. If the offload target allocated handle in a specific entry is invalid, the state object is a new offload request. Subsequent offload requests by the host stack might reuse existing Path or Neighbor state entries. The block list may contain just one state object for each layer (for example, a single Neighbor state object, Path state object, and a TCP state object), or it may be the more complex structure defined in FIGS. 6A-6B. This more complex structure, as noted, enables multiple connections, Paths, and Neighbor entries to be offloaded or terminated in a single program call.

Figure 7:
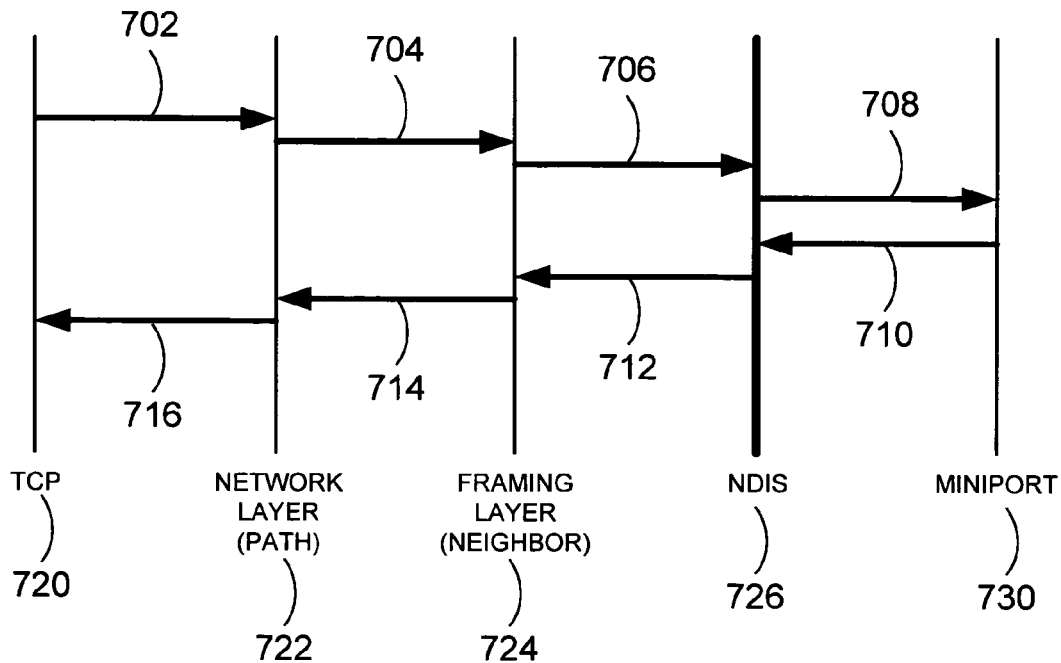
FIG. 7 shows a possible signal sequence between intermediate software layers in a network protocol stack for updating a cached state portion of a state object in accordance with the teachings of the invention.

Once the host has offloaded the connection(s) as indicated, one or more software layers may need to update changes in their respective state object(s). FIG. 7 illustrates a possible signal sequence between intermediate software layers in a network protocol stack for updating a cached state portion of a state object in the present invention. As already noted, this is done when a software layer updates a peripheral device with changes in the layer's CACHED state variable. Updating the CACHED state variable of the state object allows the intermediate software layer and peripheral device state to be consistent.

Accordingly, FIG. 7 shows that, as each software layer updates its CACHED state variable with the peripheral device, each software layer sends an update signal down the network protocol stack until it reaches the miniport driver 730. For example, if the TCP layer 720 needs to update its CACHED state variable with the peripheral device, the TCP layer 720 sends a signal 702 to the Network Layer (Path) 722, which sends an update signal 704 to the Framing Layer (Neighbor) 724, which in turn sends an update signal 706 to the Network Driver Interface Specification (NDIS) 726, which sends a signal 708 to the Miniport driver 730. Once the CACHED state variable has been updated with the peripheral device, the Miniport driver 730 relays a signal 710 to NDIS 726, which continues the set of relays 712, 714, and 716 to the TCP layer signaling that the TCP CACHED state variable has been updated with the peripheral device. An alternate embodiment is that CACHED state updates go directly to the offload target, rather than through the intermediate layers.

Since the present invention uses the block list data structure, these series of updates and confirmation steps need only occur at the software layer that initially updated the CACHED state variable. That is, for example, if the Framing Layer (Neighbor) 724 needed to update its CACHED state variable portion of its state object with the NIC, only steps 706, 708, 710, and 712 would need to occur. The upper software layers of the network protocol stack, therefore, would not need to participate in the signal relay for updating the Framing Layer's CACHED state. This ability to update multiple connection state changes with the block list also enables a high degree of connection integrity for each of the offloaded network connections. In an alternative embodiment, the update communication can be allowed to occur directly between the software layer performing the update and the Miniport driver 730. However this requires a large number of call interfaces to the Miniport Driver 730, and is not as easily extensible as additional network protocol layers are added to the offload.

If the host CPU or peripheral device needs to terminate the offloaded connection or state object, the present invention proposes a similar sequence of signaling steps. As a preliminary matter, either the host or the offload target can terminate an offload. An intermediate protocol layer can also indirectly terminate an offloaded TCP connection by terminating and/or invalidating the Path or Neighbor State Object that the TCP connection depended upon. This will eventually either cause a TCP connection timeout or result in a notification from the offload target that it is unable to transmit due to an invalidated Path or Neighbor State Object, which will cause the offload target to request that the TCP connection offload be terminated. A connection offload may be terminated for a variety of reasons. In general, there will be an administrative mechanism to tell the protocol stack to offload specific connections. If an offload target requests termination of offload for a connection that the administrator directed to be offloaded, the host will grant the termination, and an event will be logged for the administrator.

Alternatively, if the network interface goes down (e.g., media disconnect event), the offload target should not request termination of offloaded State Objects. The host will be notified of the event through the normal signaling event and will decide on the best course of action. As well, if the connection is reset (this occurs when a TCP RST segment is received), the offload target will indicate to the host that the connection offload should be terminated. If the next-hop address changes, causing the Neighbor state object to be changed, the host stack will ensure that the new state object is created before the old state object is invalidated. This allows the offload target to be certain that if a Neighbor or Path state object is no longer valid, it is not because of a temporary race condition in Path and/or Neighbor state object updates from the host stack. An alternate embodiment is to not ensure that the new state object is created before the old state object is invalidated and count on the offload target to be able to handle the race condition (i.e. it might request an upload, but the upload would not be granted).

Figure 8:
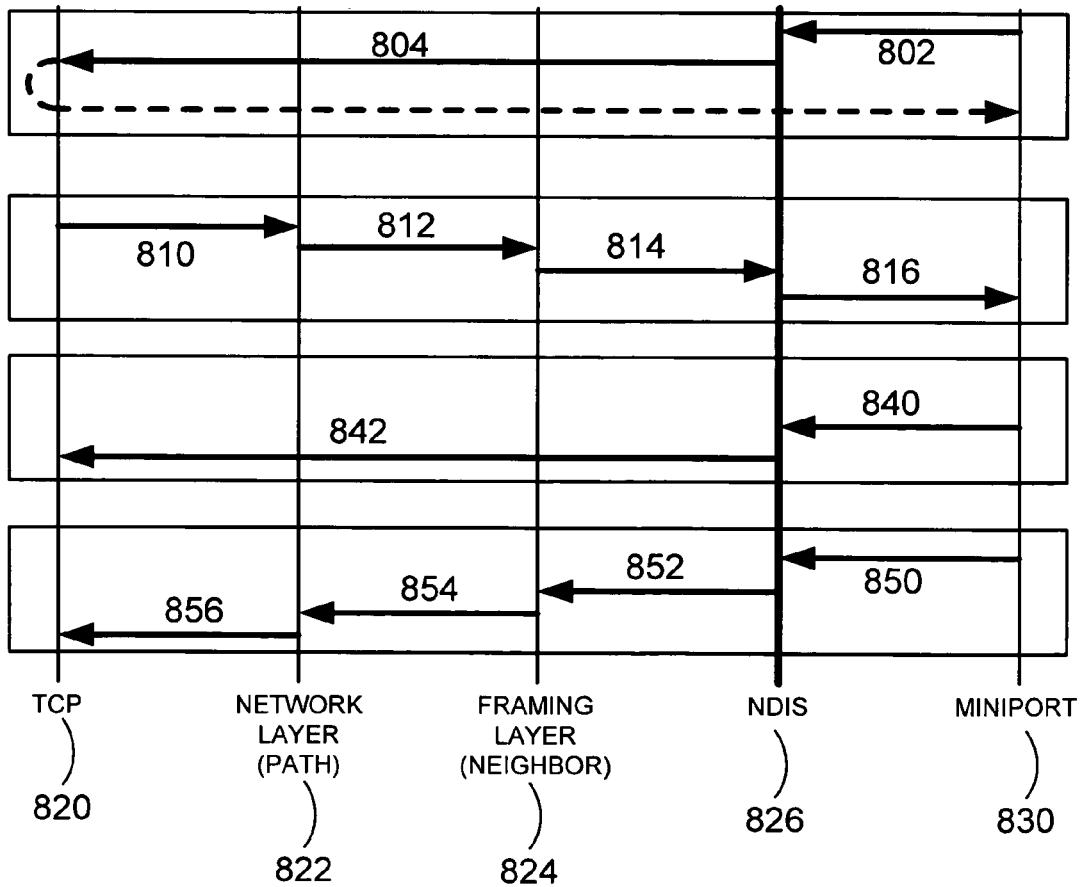
FIG. 8 is a possible signal sequence between intermediate software layers in a network protocol stack wherein the peripheral device requests termination of an offloaded TCP connection.

FIG. 8 illustrates a possible signal sequence between intermediate software layers in a network protocol stack wherein the peripheral device requests termination of an offloaded TCP connection. In the event a peripheral device decides to terminate an offload, the peripheral device requests the host stack to terminate the offload by calling an "indicate" function (as advertised by the host stack), and includes a reason the peripheral device wishes to terminate the offload. This reason may be a variety of reasons, including a situation where the peripheral device does not support a specific network protocol layer feature, such as it received urgent data and doesn't support it. The peripheral device termination request, for example, follows a series of signals (802, 804) through the protocol layers that begins with a call 802 from the Miniport driver 830 to NDIS 826, which in turn sends a termination request signal 804 to the TCP layer 820. Once the host processes the peripheral device's termination request, the host confirms the request by completing it to the Miniport driver 830. Note that some upload requests are mandatory (i.e. the host will always upload) and some upload requests are optional (i.e. the host may upload).

Once the host stack decides to terminate the offload, FIG. 8 illustrates that the host stack sends a signal through each of the intermediate software layers alerting the intermediate layers of the termination. For example, TCP 820 sends 810 a signal to the Network Layer 822 of the termination, the Network Layer sends 812 a signal to the Framing Layer 824 of the termination, and on down through the network protocol stack with signals 814 and 816. In the case of the highest layer (e.g. TCP) of the intermediate software layer, once the TCP Transport Layer 820 (i.e., Transport Layer 300) requests the termination, the TCP (or Transport) Layer will stop posting new application send or receive buffers to the offload target, and will start buffering any received TCP Segments until the peripheral device has successfully uploaded the network connection(s). By contrast, each lower software layer in the network protocol stack will check to see if the respective layer is the last dependent block list data structure for their state object. If the respective intermediate layer has no more dependent blocks, then the respective layer will also request termination of their respective state object by adding an additional block list data structure to the list, and include an offload target handle for the intermediate layer's respective state object. If it does have additional dependent blocks, it will simply forward the upload request to the next layer without requesting upload of its state object. See signals 814 and 816.

When the offload target (e.g., the peripheral device) has confirmed the requested termination through the network protocol stack, the offload target ceases processing incoming network connection data, and brings the processing of the outgoing network connection data to a consistent state. With respect to outstanding requests (i.e., the application layer has posted network connection data buffers before confirming the offload termination), the offload target responds with a status signal (840, 842) back up through the network protocol stack that states that a connection "upload" is "in progress" and returns ownership of the buffers to TCP Layer 820. If there is any received network connection data for which the peripheral device has already acknowledged reception to the remote computer (i.e., a remote peer computer on the WAN), but the host's application has not yet posted a buffer to consume it (for eventual processing), then the peripheral device will package this posted buffer as part of the TCP DELEGATED state variable that it returns to the intermediate software layers.

In either case, the peripheral device returns control (e.g., signals 852, 854, 856) of each DELEGATED state variable (e.g., through NDIS 826) for each intermediate software level so that the host CPU regains control of the DELEGATED states. Thus, the offload target ensures that a consistent snapshot of the requested DELEGATED state from the various layers is made, fills the state into the state structures associated with the OffloadBlockList structures, and calls the terminate offload completion function (850). Again, because of the offloaded block list data structure, the connection termination call may be done for one or several connections at once.

One or more virtual device driver(s) may also be provided that manages one or more physical peripheral device drivers, such as one or more NIC drivers. The virtual device driver may expose a single Media Access Control (MAC) address to the host stack, and provide a mapping between the host stack and the one or more peripheral device drivers that the virtual driver manages. Or the virtual device driver may effectively provide multiple logical interfaces to the host stack for one (or more) physical peripheral devices, enabling the host stack to manage network traffic as if there are more networks than there are physical peripheral devices. Consequently, the peripheral device drivers are abstracted in such a way that the host stack sees one or more virtual device driver(s), and thus has no knowledge of the underlying one or more peripheral device drivers. Note that the virtual device driver may be separate from the physical device drivers or may be embedded within them. In an alternate embodiment, a virtual device driver is not used and a single physical peripheral device can enable multiple source MAC addresses.

The virtual peripheral device is enabled by allowing it to participate in the peripheral initialization process, such that it can redirect all calls to the physical devices through itself, and potentially advertise greater or fewer virtual peripheral devices to the host stack than there are physical peripheral devices in the system.

During data transfer, for failover support within the team of peripheral devices, the virtual peripheral device can detect if a specific physical device has failed. There are a variety of mechanisms to support this, including detecting if the media sense has been lost, or by a constant heartbeat from the offloaded peripheral device to the network switch in the form of a signal repeated over fixed intervals. If the peripheral device detects that the heartbeat is lost (by, for example, no longer detecting the signal) the peripheral device driver signals this event to the virtual peripheral device.

The invention enables the virtual peripheral device to recover the offloaded state objects and attempt to move the network traffic to another peripheral device in the team. The virtual peripheral device can do this in a variety of ways, either by utilizing the host network stack to manage stack while the failover to another physical peripheral device occurs, or by halting new protocol offload requests and moving the state objects to the new physical peripheral device itself.

If the virtual peripheral device chooses to allow the host protocol stack to manage the offloaded state objects or connections (in the case of TCP) during the transition, the virtual peripheral device requests that the host protocol stack to cease offloading connections to the peripheral device and upload the existing state objects that the host has already offloaded to the peripheral device. Until the virtual peripheral device re-enables offload, the host processes the links or connections in its intermediate software layers.

The virtual device driver has knowledge of all available peripheral devices in a team of one or more peripheral devices. Once a peripheral device has failed, the virtual device driver then selects a new peripheral device that may be capable of receiving an offload of the connections or state objects. The virtual device driver detects what resources the new peripheral device may have, and initializes any state required in the peripheral device. Once the peripheral device has been initialized, the virtual device re-enables the offload of state objects.

When the host stack is re-enabled to offload to a specific virtual peripheral device, it re-queries the virtual peripheral for its offload capabilities. The host will use the new list of capabilities to select which state objects or connections can be offloaded. This may result in re-offloading the connections to the virtual peripheral (and consequently the new peripheral device) by transferring control of the inverted tree (i.e., by transferring the delegated, cached, and const state variables), depending on the new peripheral device capabilities that were advertised. Alternatively, if the new physical peripheral device does not support offload, the host will simply continue processing the connections itself through the intermediate software layers, rather than attempt to offload them.

Alternatively, the virtual peripheral device may choose to manage the transition of offloaded state objects between peripherals itself. If this is done the virtual peripheral device can still use the above described sequence of events to stall offload requests while it moves the state directly (rather than moving the offloaded state objects back to the host protocol stack), and advertise any changes in capabilities when the failover has completed.

Since the host maintains consistent state as offload capabilities vary, even though specific state objects or connections may be offloaded, and since the host may renegotiate parameters with a new peripheral device in the event of failover of an initial peripheral device, the present invention provides a novel, robust method of offloading and uploading one or more state objects or connections at once, regardless of peripheral device failure.

If the virtual peripheral device is configured to support multiple virtual LANs on one or more physical peripheral devices, the virtual peripheral device would again intercept the physical device initialization, and instead advertise one or more virtual peripheral devices to the host stack, and ensure that all calls made to a specific virtual adapter are mapped to the appropriate virtual LAN tag and physical peripheral device. During offload the Virtual ID is transferred in the initial offload request, either by adding to the Framing Layer state object or by creating a new state object for the virtual peripheral device. Specifically, the invention enables the virtual device to insert a structure into the BlockList structure, immediately under the Framing Layer structure in the BlockList, or to add to the Framing Layer BlockList state object the VID. The former approach also enables the virtual peripheral device to specify to the physical peripheral device opaque data (potentially vendor proprietary data). When the connection is uploaded, if an additional state object was added by the virtual peripheral device during offload, the virtual peripheral device removes the structure and hands the rest of the Block List to the host protocol stack.

Now that the methods of offloading and uploading a TCP connection has been described, a method of offloading the computation associated with IPSec authentication and/or encryption shall be described. A Security Association (SA) is a simplex "connection" that affords security services to the traffic carried by it. To secure typical, bi-directional communication between two hosts, two Security Associations (one in each direction) are required. A Security Association is uniquely identified by a triple consisting of a Security Parameter Index (SPI), an IP Destination Address, and a security protocol (e.g., AH [Authentication Header] or ESP [Encapsulating Security Payload]) identifier. Technically, if both AH and ESP protection is applied to a traffic stream, then two (or more) SAs are created to afford protection to the traffic stream in a single direction. If protection is required in both directions (which is typical), potentially four SAs are necessary if both AH and ESP is enabled. For the purpose of explanation, a Security Associations for AH, ESP, or ESP within AH encapsulation is referred to as a single SA Offload Block. The SA Offload Block may include the SA state necessary for a single direction of network traffic or for bi-directional communication. Additionally, the SA Offload Block may contain multiple SAs. In the description that follows, various commands shall be mentioned. These commands will be discussed hereinbelow.

In general, the host stack maintains complete control over when specific SAs within an Offload Block are offloaded, uploaded, invalidated, or re-keyed. The host stack and offload target coordinate to maintain all of the metrics for when an SA is invalidated, including support for both soft and hard limits on SA expiration. In general the approach used is to minimize the timer requirements for the IPSec offload target. Soft expiration time limit is done by the host stack. Hard expiration is done by both the host stack and the offload—the host stack maintains a timer to delete the SA, and the offload target does a time comparison on each packet sent or received to ensure the hard time limit has not been exceeded. Soft and hard byte count limits as well as packet limits (protection against wrapping of the sequence number) are done by the offload target.

Figure 9:
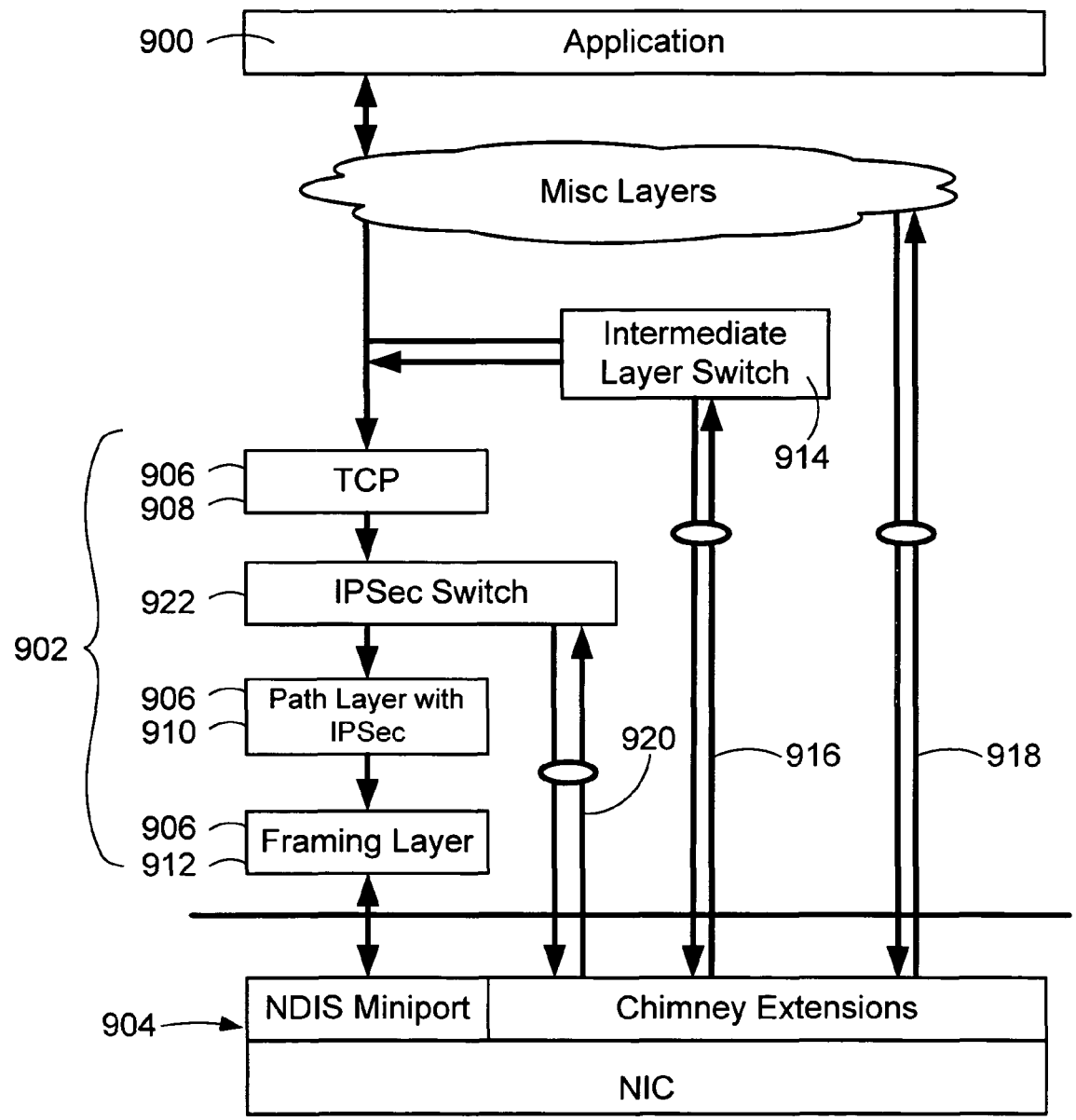
FIG. 9 is a block diagram illustrating the functional layers of the network stack and the IP security path and other bypass paths in accordance with the present invention.

FIG. 9 illustrates the interrelationship of some of the components that make up a networking model and the components of the present invention. During normal operation, networked messages are sent by the application 900 through network stack 902 to the peripheral device 904 where the messages are sent to other devices and applications on the network. Additionally, networked messages may be received from the other devices and applications using the peripheral device, which then passes the networked messages through the network stack 902 to the application 900. The network stack 902 includes one or more intermediate software layers 906. Data sent from application 900 travels through the intermediate software layer(s) 906 where specific operations may be performed on the data such as packaging the data, reliable data transmission, and calculation of a message digest. The intermediate software layers includes transport layer 908, path layer 910 (also known as a "network layer"), and neighbor layer 912 (also known as a "framing layer"). Note that path layer 910 provides IPSec operations for SAs that have not been offloaded.

The switch 914 is used to offload the processing unit 120 from performing network stack operations for the intermediate software layer(s) 906. The IPSec switch 922 is used to offload the processing unit 120 from performing IPSec operations for the intermediate layers 906 and/or from chimneys 916, 918. While the switch 914 is shown separately, it should be noted that the switch 914 may be integrated into the top intermediate layer of the network stack 902. Similarly, IPSec switch 922 may be integrated into an intermediate layer of the network stack 902. After offloading the network stack operations, data is sent to the peripheral device 904 via chimney 916 or 918 for the peripheral device 904 to perform network stack operations. IPSec operations are sent to the periphery device 904 via IPSec switch 922 and chimney 920 to perform IPSec operations. Actual data transfer may not occur through IPSec switch 922 if all network traffic is offloaded through a chimney(s) above IPSec switch 920 (e.g. chimney 916 or 918). In this case, IPSec CACHED state is maintained through chimney 920 and the offload target encapsulates/de-encapsulates IPSec for the chimney 916 (or 918) traffic. In this hierarchy, the intermediate software layers and IPSec operations do not have to exclusively reside in the host or the peripheral device and it allows any of the intermediate layers to either be completely offloaded, to remain in the host, or a combination of both (e.g., offload one or more specific connections). Additionally, chimneys may be layered on top of chimneys or below chimneys (e.g., an IPSEC chimney may be layered on top of or below a TCP chimney and a TCP Chimney may be under an RDMA chimney or above an IPSec Chimney). Each chimney 916, 918, 920 provides the ability to offload the top layer protocol and underlying required protocols. For example, IPSec chimney 920 supports offload of IPSec functions as well as path layer (e.g., IPv4 or IPv6 functionality) and framing layer (e.g., MAC layer encapsulation) offload.

Figure 10:
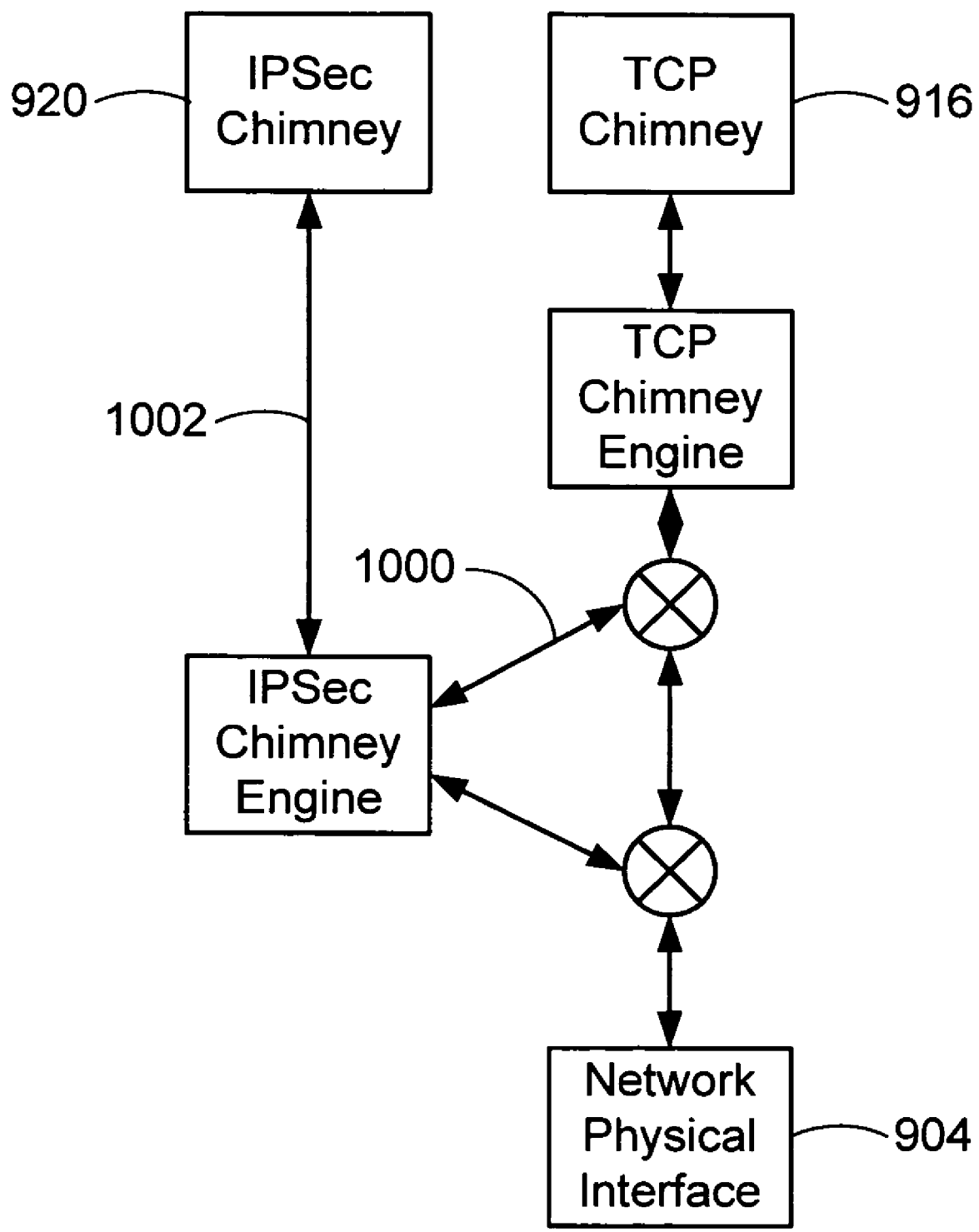
FIG. 10 is a block diagram illustrating data transfer modes of the IP security path of FIG. 9.

Turning now to FIG. 10, data transfer to an IPSec chimney can occur in one of two modes. The first mode is when the only data transfer is to offloaded TCP connections. In this first mode, during normal data transfer, the IPSec Chimney interface is only used for control functions (e.g. re-keying). Data transfer occurs directly to and from the highest level chimney (e.g. TCP Chimney 916) as represented by interface 1000. The second mode is when data transfer is occurring on a mix of offloaded and non-offloaded state. If data transfer is occurring through offloaded connections and non-offloaded connections (or for other protocols such as UDP), then the offload target must be able to accept data to encrypt/decrypt from two sources: the IPSec chimney 920 (as represented by interface 1002) and an internal interface 1000 within the offload target between the TCP chimney and the IPSec functionality. Specifically, for outbound traffic, unencrypted/unauthenticated data can be given to the offload target to be encrypted/authenticated via either the IPSec Chimney 920 or through an offload target internal interface 1000 to its TCP module. For inbound traffic, the offload target must decrypt/authenticate packets for offloaded SAs and determine whether they should be handed up to the IPSec Chimney interface 1002 or to an internal interface 1000 to the TCP offload engine.

The inverted tree data structure is similar to the inverted tree of FIG. 6A. The IPSec Chimney 920 creates a new layer of offload state above the path state object to encapsulate the Security Association Offload Block state. If a TCP connection is being offloaded, the state object is inserted between the TCP state object and the path state object in the inverted tree. This is due to the following issues. One issue is that multiple TCP state objects may map on to the same Security Association. For example, a single Security Association may protect all port 80 traffic between two host computers. Another issue is that multiple Security Associations can map on to the same path entry. For example, if there are two different Security Associations between two host computers, e.g., if one is for protecting web traffic and one is for protecting SMTP traffic, then both of them will map to the same path entry. Another issue is that a TCP state object may not have a secure policy associated with it. It may map directly onto a path entry. In other words, the security policy applied to a machine may not require security to a specific subnet or host. Thus all traffic destined to that subnet/host or sourced from it will be exempt from IPSec security requirements.

Figure 11:
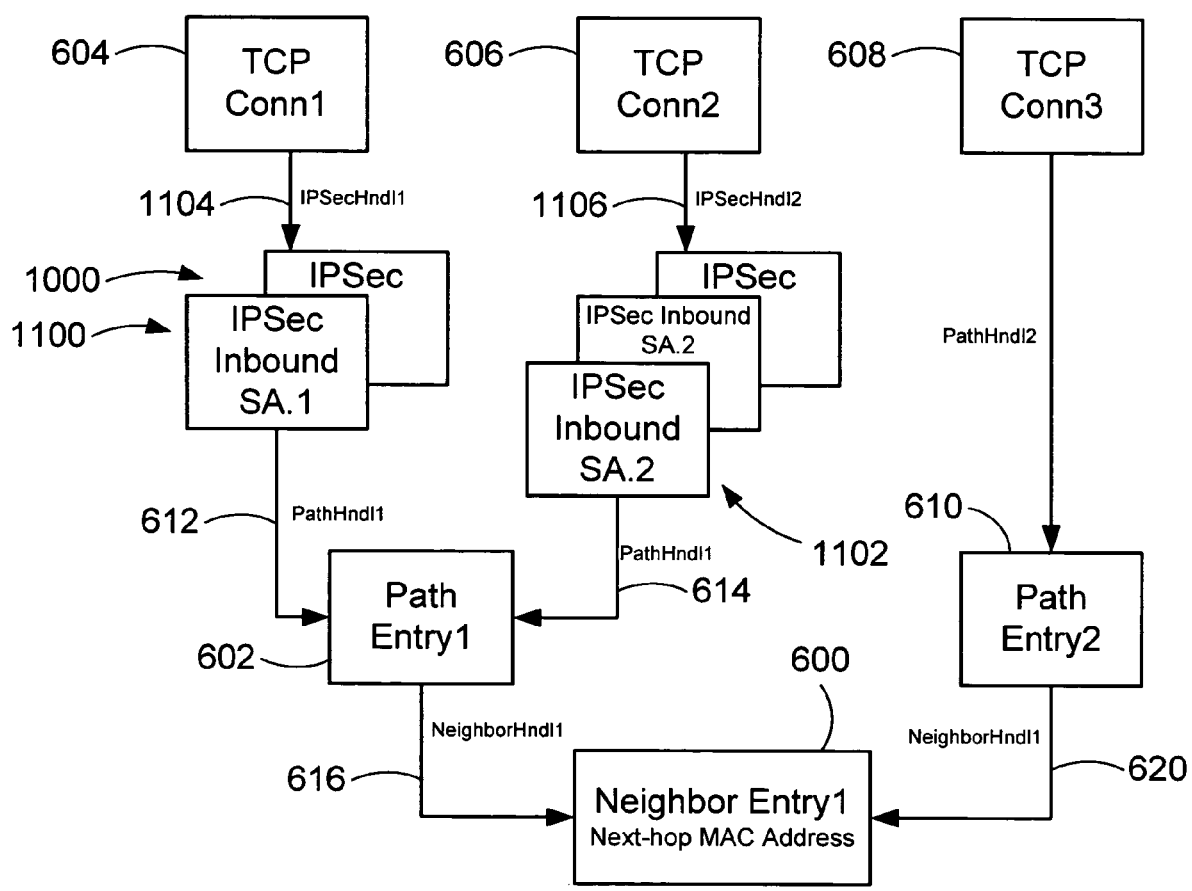
FIG. 11 is a block diagram illustrating an inverted tree having IP security associations in accordance with the present invention with respect to a collection of block pointers.

FIG. 11 shows the inverted tree data structure having IPSec state objects. As in FIGS. 6A, there are two TCP connections 604 and 606 (i.e., TCP Conn1 and TCP Conn2) that have different TCP layer state entries, but have different IPSec state entries 1100, 1102. The IPSEC state entries have a common Path (or Network Layer) state entry 602, and common Neighbor state entry 600. A different network connection 608 (i.e., TCP Conn3) does not have an IPSec entry and has a separate Path state entry 610, but a common neighbor state entry 600. The entire sequence hierarchy can be defined between each software layer by a series of path handles that direct the connection to the next software layer. For example, path handle 1104 directs TCP state entry 604 to IPSec state entry 1100 and path handle 1106 directs TCP state entry 606 to IPSec state entry 1102. Path handles 612 and 614 direct IPSec state entries 1100 and 1102 respectively to Path state entry 602, which in turn has a handle 616 directing it to Neighbor state entry 600. Similarly, TCP state entry 608 has a handle 618 that points to a Path state entry 610, which in turn is directed to common Neighbor state entry 600 via handle 620. In accordance with the invention, FIG. 11 can also be expressed in terms of Next block pointers, to thereby include multiple network connection chimneys at once.

Figure 12:
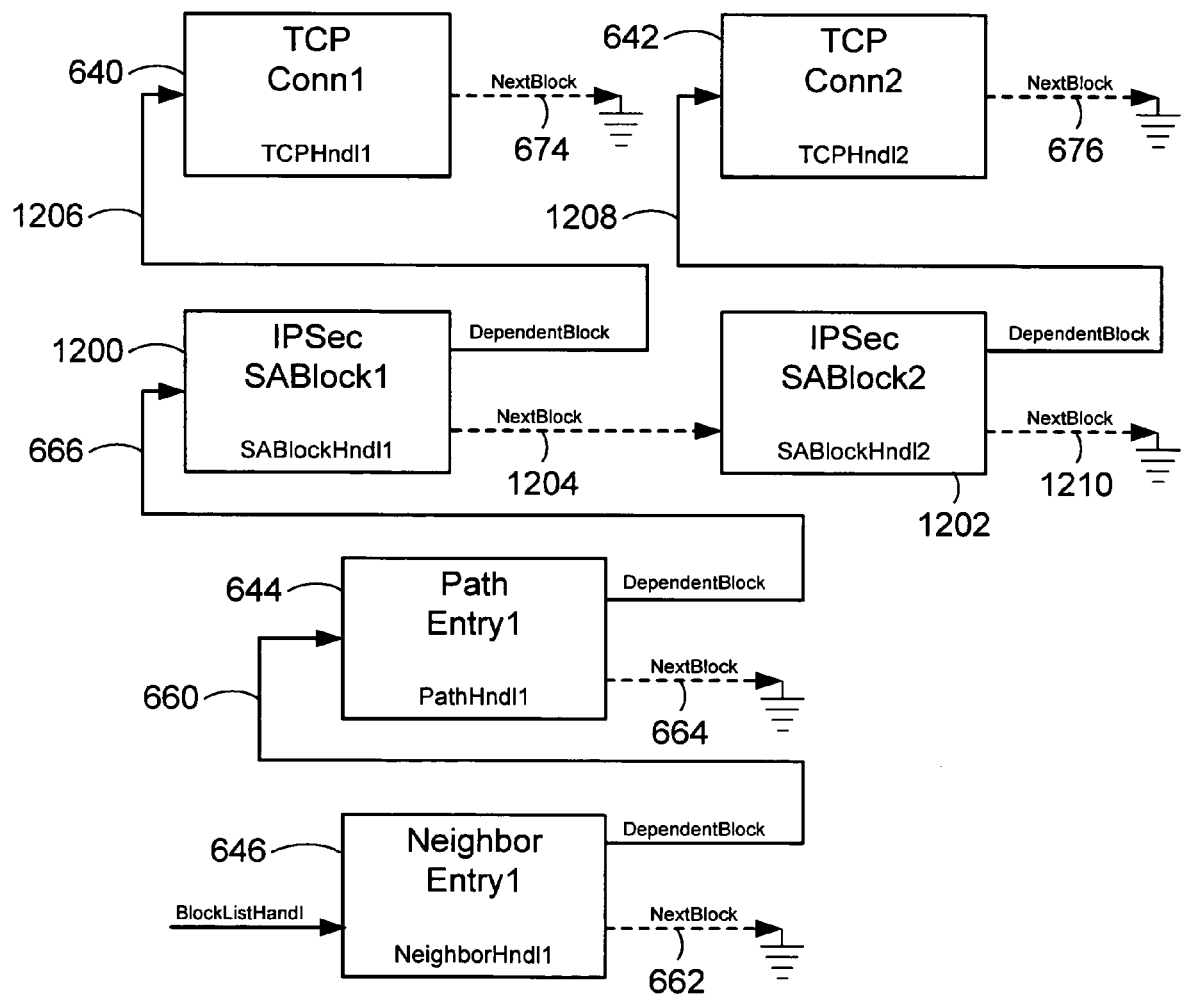
FIG. 12 is a block diagram illustrating an inverted tree having IP security associations in accordance with the present invention with respect to a collection of block pointers.

FIG. 12 illustrates how the block list handle (collection of various Next and Dependent block pointers to represent path dependencies) relates several network connection blocks among different network connections for simultaneous offload. As in FIG. 11, FIG. 12 denotes the inverted tree in terms of software layer blocks that include the various software state handles. Shown are TCP blocks 640 and 642 with IPSec blocks 1200 and 1202 respectively, a common Path block 644, and a common Neighbor block 646. The block list handle would state that Neighbor block 646 include a Dependent Block pointer 660 that points to Path block 644. Path block 644 includes a Dependent Block pointer 666 that points to IPSec block 1200. The IPSec block 1200 may also point to another inverted tree data structure through Next Block pointer 1204. If the Next Block pointer 662 is missing (e.g., a NULL value), this may signal in the block list that there are no other inverted trees at that layer of the inverted tree.

As in the case of the Path block 644, both IPSec blocks 1200 and 1202 each have Dependent block pointers 1206 and 1208 respectively, and a Next Block pointer 1204 and 1210 respectively, such that IPSec block 1202 may also point to a different connection Path of an entirely different inverted tree. In addition, each of the TCP blocks 640, 642 have Next Block Pointers 674, 676 that may point to another TCP block in the same inverted tree or may indicate that there are no more blocks in the tree. These pointers are not, however, static. That is, the links may change such as if a route for a path changes, it may change the next neighbor to a different route. In that case, for example, Path block 644 might change the neighbor state entry it uses from Neighbor Entry1 646 to some other neighbor, (e.g. Neighbor Entry 2 (not shown)). Accordingly, the use of a block list enables multiple connections, paths, and neighbor entries to be offloaded or terminated in a single program call.

With respect to FIG. 12, during operation, the TCP Layer initially creates an offload request which contains two TCP state objects 640, 642 (i.e., blocks), Conn1 and Conn2, with BlockListHand1 pointing to TCPConn1 and TCPConn1, NextBlock pointing to TCPConn2. The miniport handles are NULL (i.e. TCPHdnl1 and TCPHndl2 are NULL) because the state has not been offloaded before. Both state objects are identified as having a policy which requires IPSec, causing the offload request to be handed to the IPSec layer. The IPSec layer finds the associated FilterID and associated SAs as described hereinbelow. It packages up the SA Offload Block state and fixes up the DependentBlock and NextBlock pointers in the TCP state objects 640, 642 and IPSec state objects 1200, 1202. It then hands the offload request to the path layer, with the BlockListHnd1 pointing to IPSec SABlock1. The Path Layer determines that both IPSec state objects are dependent on the same Path Entry1. It allocates state appropriately, fixes up the pointers, and hands a BlockListHnd1 to the Neighbor Layer which points to PathEntry1. A similar sequence of events occurs at the Neighbor Layer, causing the entire state structure to be handed to the offloaded target with a NeighborEntry1 state object.

Assuming the offload target agrees to offload the state, it will create an opaque offload handle for each state object and set that value in the state object (e.g. TCPHndl1, SABlockHndl1, etc). When the completion routines are called for each layer, the miniport offload handle is stored within the host stack for each state object so that any future requests can include the handle. If additional offload requests occur for the same state, a state object is allocated and inserted into the tree, but no state is initialized other than the miniport offload block handle.

The contents of an IPSec state object are based on the following design principles. One principle is that poll based algorithms are too expensive (e.g. to enable the host to manage soft or hard time limits on bytes and packets, outbound idle interval). Another principle is that handling a primary Keepalive SA (as described below) in software on high-speed links would cause an unacceptably high percent of the inbound IPSec packets to be handled by software. Thus the offload target in one embodiment handles a single keepalive SA (i.e. a total of two inbound SAs). However, while it is theoretically possible to have more than one Keepalive SA, the probability is quite low and it increases the required offload target state substantially, the invention also allows any other Keepalive SAs to be retained in the host stack. Another principle is that the number of timers in the offload target should be minimized. Specifically, lifetime timers for SA and timers to delete keepalive SAs are not offloaded.

Another principle is that offload processing of IPv4 options and IPv6 extension headers is viewed as undesirable because of the infrequency of use, the added complexity, the possibility of new options/extensions to be defined, and the potential for security attacks. Thus the host stack processes received IP options/extension headers and generates required IP options/extension headers. An exception to this is IP fragmentation and defragmentation. Defragmentation and defragmentation of IP datagrams is viewed as desirable because of UDP traffic.

As previously indicated, the software layers have a state object, which may include one or more of a constant state variable, a cached state variable, and a delegated state variable. The IPSec offload object has a data structure that also has constant, cached, and delegated state variables. The IPSec offload object can have any number of SAs present. In one embodiment, the number of SAs present is limited to three in order to limit the amount of state offloaded to the peripheral device.

The CONST state variables for the IPSEC object consist of information required to classify packets to a particular security association and information specific to inbound and outbound security associations. The CONST variables include local and remote ports, local and remote IP addresses, protocol type, and security association flags. A setting of zero in the local port (or the remote port) setting indicates that the local port (or the remote port) is a wildcard port, which means that any port may be used. Similarly, if the protocol type is zero, then any protocol may be used.

The security association flags include DynamicSA, InfiniteLife, and flags for inbound SAs. The DynamicSA flag provides an indication of whether the SA rekeys or is a manual SA. The InfiniteLife flag designates if the SA has an infinite lifetime. If the InfiniteLife flag is not set, it indicates that a rekey is performed for an SA that rekeys when a soft expiration (as explained below) is reached. For a manual SA, the set InfiniteLife flag indicates that the SA will stay alive forever. If the InfiniteLife flag is not set, the SA will become invalid when the hard expiration is reached. The flags for inbound SAs include InBoundAHReplay and InBoundESPReplay, which indicates whether replay check is enabled for AH or ESP, respectively.

The CACHED state variables comprise variables for adding, deleting, or overwriting (i.e., replacing) a SA, for deciding the life time of the SA, and information specific to inbound and outbound SAs. The CACHED variables include an opcode, a soft limit and a hard limit based on the bytes encrypted, a soft limit and a hard limit on the number of packets to soft expiration and hard expiration, flags, AH and/or ESP parameters if AH and/or ESP is enabled, outbound idle interval, and other variables. Note that the NIC abides by the soft and hard limits. When a soft limit is reached, the NIC alerts the network stack for the host processing unit to rekey the SA. When a hard limit is reached, the NIC discards the security association.

The opcode variable indicates if a SA should be added, deleted, or replaced. If the SA is being replaced, an OLDSPI flag is set. The OLDSPI flag is set to AH SPI if the replaced SA had AH enabled. The OLDSPI flag is set to ESP SPI if the replaced SA did not have AH enabled. The SPI is a unique identifier on a per IP address, which is used to identify a SA. It indicates which SA is being operated on with respect to the variables.

The soft limit can be reached based on a number of factors, including when the number of kilobytes encrypted reaches a specific limit. If the number is reached, the offload target will alert the host stack, at which time the SA is typically rekeyed. Inbound SAs (i.e., a SA for an inbound connection as compared to an outbound SA for an outbound connection) are not immediately invalidated upon a rekey because a network can store packets for a lengthy period of time. In order for all packets encrypted and/or authenticated on an old SA to drain from the network, the SA is moved to a keep alive state (i.e., a keep alive SA) for a period of time to allow the packets to drain from the network. Typically, the soft limit is set to approximately fifty percent of the hard limit to allow time for the SA to be replaced with a new SA (e.g., re-keyed). At the soft limit, the rekey process is initiated. The hard limit, which indicates when the SA is discarded, can be reached based on a number of factors, including when the number of kilobytes encrypted reaches a specific limit.

Similar to the limits on the number of bytes encrypted, the soft limit on the number of packets to soft expiration is the number of packets sent before the network stack is alerted to begin the process of rekeying. When the hard limit of the number of packets sent is reached, the SA is discarded.

The flags are used to indicate whether the SA is an inbound SA or an outbound SA, whether AH is enabled, whether ESP Confidentiality is enabled, and whether ESP integrity is enabled. The outbound idle interval is used to initiate re-keying. If the last time an outbound packet was seen on the SA was at least as much time as the outbound idle interval, re-keying is initiated. The AH parameters, which are valid if the AH flag is set, include AHSPI, AHAlgorithm (AH Integrity algorithm—{MD5, SHA1, SHA-256, SHA-384, SHA-512, proprietary1 (a proprietary algorithm)}), AHKeyLength (AH integrity key length), and AHKey (AH integrity key). The ESP parameters, which are valid depending on how the conf/integrity flags are set, include ESPSPI, ESPIntAlgorithm (ESP integrity Algorithm—{MD5, SHA1, SHA-256, SHA-384, SHA-512, proprietary1}), ESPIntKeyLength (ESP integrity key length), ESPIntKey (ESP integrity key), ESPConfAlgorithm (ESP confidentiality algorithm—{DES, 3DES, AES-128, AES-192, AES-256, proprietary1}), ESPBlockLength, ESPConfKeyLength (ESP confidentiality key length), and ESPConfKey (ESP confidentiality key)

The DELEGATED variables comprise running information and information specific to inbound and outbound security associations. The DELEGATED variables include flags, a count of the bytes transferred over the SA, the number of ticks the SA has been idle, the number of confidential bytes transferred over the SA, the number of authenticated bytes transferred over the SA, and outbound or inbound parameters.

The flags include a valid flag that indicates whether the SA is currently valid. The outbound and inbound parameters include AH parameters if AH is enabled and ESP parameters, which are valid depending on how the conf/integrity flags are set. The outbound AH parameters include LastPacketNum (the sequence number of last AH packet sent over the SA). The outbound ESP parameters include CurrentIV (the Current Initialization Vector) and LastPacketNum (the sequence number of last ESP packet sent over this SA). The inbound AH parameters include CurrentReplayMap (the current AH replay bit map) and CurrentReplaySeq (the current AH replay last sequence number). The inbound ESP parameters include CurrentReplayMap (the current ESP replay bit map) and CurrentReplaySeq (the current ESP replay last sequence number).

Now that the overall architecture components and variables have been described, the steps to offload an IPSec state object shall be described. The offload target such as the peripheral device 904 (e.g., a NIC) uses a data structure that combines the peripheral device's capabilities and initialization configuration parameters that are set by the stack 902. The capabilities the peripheral device specifies includes the number of outbound Security Associations that can be offloaded to the NIC, the number of inbound Security Associations that can be offloaded to the NIC, and flags. The number of inbound SAs that can be offloaded must be at least as large as the number of outbound SAs that can be offloaded to the NIC. It is recommended that this number be twice that of the number of outbound SAs to allow for keep-alive SAs (e.g., each SA Offload Block can have one outbound SA and two inbound SAs). In an alternate embodiment, the offload target advertises the number of SA Offload Blocks it supports and flags. The value of the SA Offload Block parameter includes the ability to have an outbound SA and two inbound SAs for each SA Offload Block.

The flags include an IPSec IPv4 flag, an IPSec IPv6 flag, an authentication support flag, and an encryption support flag. If the IPSec IPv4 flag is set, the offload target must provide IPv4 support for all authentication and encryption algorithms that it supports. If the IPSec IPv6 flag is set, the offload target must provide IPv4 support for all authentication and encryption algorithms that it supports. The authentication support flag indicates the authentication algorithms supported. The algorithms that may be supported include MD5_Ah, MD5_Esp, MD5_AhEsp, SHA1_Ah, SHA1_Esp, SHA1_AhEsp, SHA256_Ah, SHA256_Esp, SHA256_AhEsp, SHA384_Ah, SHA384_Esp, SHA384_AhEsp, SHA512_Ah, SHA512_Esp, SHA512_AhEsp, and proprietary algorithms. The encryption support flag indicates the encryption algorithms supported. The algorithms that may be supported include DES_Esp, 3DES_Esp, AES128_Esp, AES192_Esp, AES256_Esp, UMAC_Esp, and proprietary algorithms.

If the stack decides to use any combination of the reported capabilities, the stack will set the initialization configuration parameters. The initialization configuration parameters include ReplayWindowSize, EnableSecurityAudit, Idle timeout time, and Ticks per Second. The ReplayWindowSize specifies the window size that packets received must be within. If a packet is not within the window size, it is dropped. If the EnableSecurityAudit is set, when an error occurs in receive processing, the packet is not dropped after the appropriate statistic has been updated. Instead, the packet is passed to the IPSec Layer using the IPSecReceiveIndicate interface using a data buffer format for the receive error. The Idle timeout time is the maximum amount of time an SA can be idle. The Ticks per Second is used to synchronize timing with other offload targets.

There are two ways to initiate the offload of an SA Offload Block. An offload can be initiated by the IPSec Module 922 or it can be initiated by the intermediate layer switch 914 (e.g., as a result of a TCP offload request through the TCP Chimney). The offload target must accept all or none of the SAs within an SA Offload Block. Within an offload initiation request, there can be multiple SA Offload Blocks. The offload target can accept or reject SA Offload Blocks individually within one offload initiation request.

Figure 13:
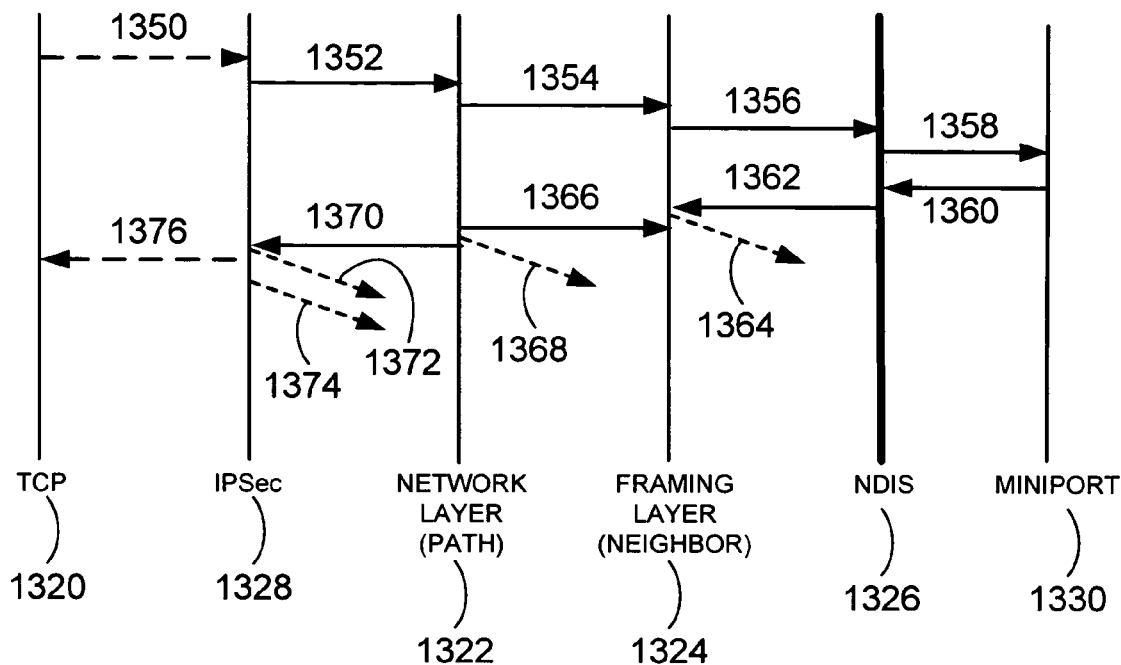
FIG. 13 is a ladder diagram illustrating an IP security block offload mechanism in accordance with the teachings of the present invention.

Turning now to FIG. 13, the steps of offloading a SA Offload block are illustrated. In the description that follows, the IPSec Module 922 will be the component requesting an offload, regardless of whether or not it includes a TCP block. In FIG. 13, solid lines are required calls, dotted lines are optional calls (depending upon specific state). All calls are shown as asynchronous, but this is not required. The return arrows for the return of the initial asynchronous calls are not shown to reduce clutter and aid in understanding the invention. Note that in one embodiment, the offload initiation request (e.g., InitiateOffload) can contain one, two, or three SAs to be offloaded, and that it can be any combination of up to one outbound SA and up to two inbound SAs. The call sequence down the protocol stack is intended to enable each layer to flag resources as potentially being offloaded, to advertise any resource requirements, to advertise any handles for up-calls that the NIC may need if the offload is successful, and to gather CONST, CACHED, and DELEGATED state at the network layer 1322 and framing layer 1324.

The offload may begin when the TCP layer 1320 requests an offload and the offload has a policy requiring IPSec. When this occurs, the offload request is handed to the IPSec module 1328 (Line 1350). The IPSec module 1328 packages up the state associated with the SA Offload Block (containing state for between one and three SAs inclusive in one embodiment)

and sends the state to network layer 1322 (line 1352). Any packets that are to be sent out on an associated SA or received on an SA after the offload state has been snapshot will be buffered until the offload request completes. Note that one or more SA Offload Blocks can be offloaded in a single call. The network layer packages its state for each network state object (as described above), adds its state to the IPSec state and sends the combined state for the IPSec module and network layer to the framing layer (line 1354). The framing layer packages its state for each framing state object and adds its state to the combined state and sends the combined state to NDIS 1326 (line 1356). NDIS hands the Offload Block List of the states (see FIG. 12) to the miniport 1330 (line 1358). The miniport 1330 looks over the state to determine if it can accept the offload request(s). The evaluation rules described above for the Offload Block List apply (i.e. depth first satisfaction of resources, where error codes are placed, etc.) This includes allocation of an Offload Handle for each Offload Block data structure that is successfully offloaded.

The offload target (i.e., the miniport 1330) calls the completion routine for the request if it accepts the offload. Note that an offload is not attempted if the SA Offload Block contains an SA that is about to expire. The completion routine indicates the offload target has captured the state completely and can at any time start receiving IPSec data (with or without a TCP Chimney) and indicate received data to the host stack. Note that this means that data can be indicated to the IPSec Layer 1328 before the offload initiation request has completed. The completion call returns the offload handle for each Offload Block (line 1360). The framing layer receives the completion for the offload request (line 1362). If the destination MAC address changed during the offload, the Neighbor layer makes an offload update call to update the cached state using the offload handle for the Neighbor state object (line 1364).

The network layer receives the completion of the offload request (line 1366). If a Path MTU (maximum transmission unit) update occurred between the initial offload request and the completion, an offload update call will be made to the offload target using the offload handle for the Path state object (line 1368). The IPSec layer 1328 receives the completion for the offload request (line 1370). Note that after the Network layer is done processing the completion, it must determine if the remaining data structures in the Offload BlockList should be handed to IPSec or to TCP directly if an IPSec offload was not requested. None of the IPSec cached state can change during the offload request. However the IPSec Layer may have buffered outbound or inbound datagrams. At this time it will use the Offload Forward interface (line 1372) using the Offload Handle that was returned by the offload target to forward any inbound datagrams to the NIC. It will also hand any outbound datagrams that were posted during the offload to the offload target (line 1374).

If the TCP layer 1320 requested the offload, the TCP layer 1320 receives the completion of the offload request if there was one or more TCP Offload Block(s) in the initial offload request (line 1376). Normal processing for the TCP Chimney 916 occurs, which might require buffered received segments to be handed to the offload target or an OffloadUpdate to occur if any cached state changes.

Note that when an offload request is initiated by a protocol stack layer above IPSec (e.g. TCP), the DependentBlock pointer in the BlockList data structure for IPSec is non-NULL (see FIG. 12). If the SA Offload Block has already been offloaded, then the IPSec layer 1328 will simply initialize an Offload Block data structure with the miniport handle for the SA Offload Block. All other layer (IPSec, Path, and Neighbor) processing remains the same. The key difference in functionality for this case is how the offload target handles the offload request. If it chooses to accept the offload request for the upper layer, it must ensure that when the completion routine is called, any traffic destined for that state object will be handed directly to that layer through the appropriate chimney (i.e., not the IPSec Chimney). IPSec Chimney data transfer for other connections or other upper-layer protocols (e.g. UDP) which are not offloaded remains unchanged (i.e. data transfer and event interfaces using the SA Offload Block continue to function).

With respect to synchronization, the IPSec layer 1328 ensures that the SA state does not change during the offload initiation by limited buffering of incoming and outgoing datagrams until the offload has completed. The IPSec layer 1328 may choose to drop packets during this time frame if excessive buffering is required. If any additional offload requests (e.g. updates to cached state, invalidation of the state, offload of an upper-layer chimney, etc.) occur for that specific IPSec state, path state, or neighbor state, and if these are not offloaded already, then these new offload requests will be blocked until the current offload request is completed. The above requirement is required because the offload target must return a Miniport Offload Handle for each Offload Block before any further processing on the offload state can occur. Note that offload requests for other connections, paths, SA Offload Blocks, or neighbor structures can occur in parallel.

Immediately after the offload target 1330 calls the completion for the offload initiation request, it can start indicating receive data to the IPSec Layer 1328 using the handle that was provided during the offload initiation request. This means that the IPSec Layer 1328 is able to start processing incoming data before the request's completion routine has been called (and returned a miniport handle for the offload target). Processing might include buffering until the completion of the offload initiation request occurs.

IPSec Offload heuristics for choosing which IPSec SA Offload Block is the "best" for offload is largely based on which SA Offload Blocks have the most traffic, combined with the suitability for offload. Conditions that will cause an SA Offload Block to not be offloaded include the inbound/outbound SA's not being symmetric and the forwarding interface for a specific SA is being overly exercised. Conditions that will cause the offload to be likely, or to keep an offloaded SA Offload Block in the offload target include high to medium amount of traffic through the SA Offload Block and whether the SA Offload Block has dependent TCP Offload Blocks.

One issue that might occur is when a TCP offload request occurs that requires an SA that is about to expire or is in the middle of a re-key. In such an event, the offload will be allowed while the re-key is occurring. Once the re-key completes, the offload update interface will be used to update the offload target. Note that the offload target enforces soft and hard limits, and in this case the soft limit will have already been reached when the offload initiation request is called. If an offload target receives an offload request for an SA that is past any of the soft limits, it should not generate an event for the soft limit. It must process the hard limits as usual. If a TCP offload request occurs that depends on a policy that requires IPSec, but none of the IPSec SAs have yet been negotiated, the IPSec module may pend the offload request (i.e. complete it asynchronously at a later time) or may simply disallow the request with an appropriate reason code so that the TCP Chimney 916 knows that it can try again at a later time.

A connection may be uploaded by the IPSec driver for a variety of reasons. These reasons include too much data is being forwarded to the offload target by the IPSec Layer through the IPSecOffloadForward interface, no neighbor entry, no path entry, a media disconnect on the offload target (this indication will be received directly by the IPSec layer 1328 and appropriately processed—thus the offload target does not generate the upload all indication), if the host stack attempted to add or replace an already offloaded SA Offload Block, and the offload target failed the call, a policy change, administrative control, and a low bandwidth connection (not much data being transferred).

There are two ways in which the offload of an SA Offload Block can be terminated (i.e. uploaded back to the host stack). The miniport can initiate the upload or the host stack can initiate it. The host stack's initiation of upload can be originated by a layer above the IPSec Layer or by the IPSec Layer itself.

Note that there may be offloaded TCP connections (if the offload target supports TCP Chimney) which prevent a specific SA Offload Block from being uploaded until the reference count of dependent TCP state objects goes to zero. This ensures all offloaded TCP state objects will be uploaded before an IPSec Offload state object is uploaded. Thus, offload targets which support both IPSec Chimney and TCP Chimney can not perform an IPSec "Upload All" without previously performing a TCP "Upload All" (i.e., it must perform an "Upload All" to TCP Chimney before it requests it of the IPSec Chimney to ensure that all state is uploaded).

In one embodiment, the only upload supported is a "lazy upload" wherein the host stack may take a significant amount of time to perform the upload. This optimization is done so that the IPSec layer does not have to keep track of all the upper layer chimneys which have offloaded state objects. If the offload target could cause a mandatory upload and there were many upper layer chimney objects dependent on the offloaded SA Offload Block, then before the SA Offload Block can be uploaded, either all of the upper layer chimneys would have to upload their state first, or the offload target would have to be able to accommodate upper-layer chimneys whose IPSec state is uploaded in the middle of data transfer (not just invalidated). The host network stack state that would need to be tracked can be very large per SA Offload Block and scales as the number of offloaded SA offload blocks. For example, if there were 100,000 TCP connections per SA Offload Block and there were many SA Offload Blocks, this would cause a huge amount of state to be stored and tracked by the host stack to be able to tell which TCP connections needed to be uploaded. The embodiment of the invention instead marks an IPSec state object as "upload requested." Then a periodic timer fires to re-evaluate offloaded state in the upper layer chimney. The timer "walks" the offloaded connections to see if any dependent IPSec state objects have requested an upload. If an upload has been requested, the upper layer chimney will upload its state. When the reference count of the IPSec state object goes to zero, the IPSec state object is also uploaded. Thus the offload target must continue to transfer data through the SA Offload Block while it waits for the actual upload. The upload of all SAs can be required for several reasons, including a card reset, a power state change (i.e., the power state is changing to a level that does not allow the offload target to maintain offloaded state), a failover event on a "teamed" NIC to a different offload target, or an administrative reallocation of offload resources which requires all offloaded SAs to be uploaded.

Figure 14A:
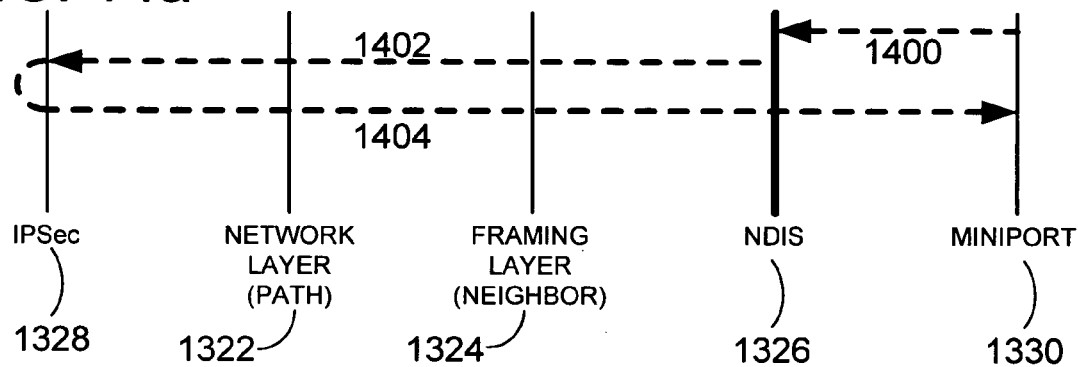
FIGS. 14a-14b are diagrams illustrating a possible signal sequence between intermediate software layers in a network protocol stack wherein the peripheral device requests termination of an offloaded IP security association.
Figure 14B:
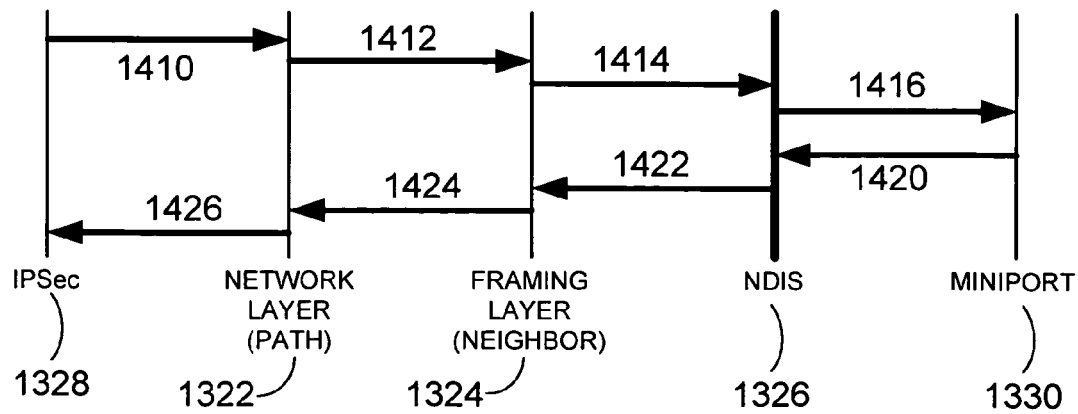

Turning now to FIGS. 14*a-b*, the call sequence for a Terminate Offload is shown. The offload target can optionally request the termination of an offload (FIG. 14*a*), or a layer above the IPSec layer (e.g. TCP) can request the termination of their state. If the SA Offload Block reference count (as described below) goes to zero, the SA Offload Block may be terminated. Regardless of where the request originated from, it is the IPSec Layer that actually performs the Terminate Offload command.

FIG. 14*a* shows the steps taken for the offload target to request the termination of an offload. The miniport 1330 decides to upload an SA Offload Block (which contains between one and three SAs, inclusive) because of any one or more of the reasons listed in the prior section. The miniport indicates a terminate offload request by specifying the SA Offload Block handle and a reason code (line 1400). The offload target must continue to process send and receive datagram requests while the terminate offload request is being processed. NDIS uses the pre-registered upload-indicate handler for IPSec with the IPSec context for this SA Offload Block and sends an upload indication to the IPSec layer 1328 (line 1402). The IPSec Layer gets the upload indication and completes the request (line 1404). Depending upon the upload request reason and whether there are dependent TCP offloaded state objects for the SA Offload Block, it may start a Terminate Offload request or it may decide not to start the request.

Turning now to FIG. 14*b*, the IPSec layer 1328 calls Terminate Offload for the network layer, with the PATH handle it has for the SA Offload Block (line 1410). The IPSec layer ensures that no additional calls for this SA Offload Block will be called (e.g. Update, Send, or additional Terminate requests). The network layer 1322 will add its OffloadBlock (consisting of just the offload handle) to the block list if the reference count for this PATH is one (i.e. the Terminate Offload request would drop the value to zero). Whether it adds the handle or not, it will then call down to the framing layer 1324 with the appropriate neighbor handle (line 1412). If the network layer has requested an offload, the framing layer 1324 will follow the same steps as the network layer 1322. Regardless of whether the framing layer requests an offload, it will call NDIS (line 1414). NDIS calls the miniport with the block list (line 1416). The offload target 1330 packages up the SA state to return it to the host protocol stack. It must ensure that the state is self consistent. The miniport 1330 must free up any state/resources associated with valid handles in the OffloadBlockList (TCP, Path, and Neighbor entries).

The miniport completes the terminate offload request (line 1420). Before completion it must complete all outstanding requests for the SA Offload Block with an UPLOAD_IN_PROGRESS call (e.g. OffloadSend, OffloadUpdate, etc) and must wait for any OffloadReceiveIndicate calls to be completed. It is free to reuse the associated state immediately after it calls the completion interface for the terminate request. Once the state is handed back to the host protocol layer (e.g. network stack 902), all datagrams received for an SA which was in the uploaded SA Offload Block must be sent through the conventional NDIS interface. The request completion percolates up the stack and the offloaded state at each layer is reinstated (lines 1422, 1424, 1426).

The IPSec Chimney 922 does not support immediate termination of an offload if there are TCP state objects offloaded for the SA. Instead, a lazy approach is taken. The IPSec state object is invalidated while the IPSec Layer 1328 waits for all dependent TCP state objects to be terminated. Periodically the TCP stack 1320 will re-verify that the filters in place are still appropriate. If they are not, TCP will terminate the offload of the TCP state object. When all TCP state objects have been terminated, the IPSec Layer 1328 will terminate the offload of the SA Offload Block.

As previously indicated, the IPSec layer 1328 keeps a SA Offload Block reference count. The reason for this is that if the offload target supports TCP Chimney and other types of Chimneys, it is possible for that layer to request a termination of the offload for its state object. IPSec keeps a reference count on a per SA Offload Block basis (i.e., the SA Offload Block reference count). For each new offload request for a dependent state object, IPSec will increment the reference count. For each termination of a dependent state object, IPSec will decrement the reference count. Note that having a single reference count does not address whether the IPSec Layer itself initiated the offload. It does not necessarily mean that the IPSec layer wishes to upload when all dependent blocks have been uploaded. Nor does simply incrementing the reference count when IPSec itself requested the offload work because IPSec can not tell the difference between a reference count that was incremented by the upper layer or whether itself incremented it. To handle such a scenario, a separate internal flag may be used which allows IPSec to mark an SA Offload Block as an offload it initiated so that it retains control.

Note that the network stack (e.g., network stack 902) may receive an IPSec datagram for an SA Offload Block that in the middle of an offload termination. This can occur when the offload target has packaged up its delegated state in response to a termination event and an IPSec datagram arrives for one of the terminated SAs. The offload target forwards them up to the host stack through the conventional NDIS path since it can not process incoming datagrams after the delegated state has been packaged. If the IPSec Layer has not yet received the completion message, the IPSec layer will buffer the received datagrams until the offload termination completion message is received, and then processes the datagrams normally. Note that the data transfer interface enables a partially processed datagram to be sent from the offload target to the host for IP option/extension header processing. If an upload occurs in the middle of this processing, the host stack will simply take over the processing.

As previously mentioned, the IPSec Chimney 922 supports two modes for data transfer. One mode is where the IPSec layer 922 is the top edge of the Chimney and all data transfer is in units of datagrams. The other mode is where the IPSec Chimney is embedded within another Chimney (e.g. TCP Chimney 916). Note that both models can be enabled simultaneously (see FIG. 10). Data transfer between the IPSec Chimney and the offload target can occur for several reasons. These reasons include: the use of the traditional software stack for sends and receives on non-offloaded SAs, the IPSec Layer directly sending an IP datagram to the offload target if the SA that applies to it has been offloaded, the IPSec Layer receiving an IPSec datagram destined for an SA that has been offloaded and forwarding the IPSec datagram to the offload target for processing, and the offload target receiving a datagram which uses an offloaded SA and there is no higher level Chimney offloaded for the datagram and the offload target sending the decrypted/authenticated payload to the IPSec Layer.

During operation, the upper layer protocol (e.g. UDP or TCP) hands IPSec a formatted datagram to transmit. An asynchronous interface is used to hand a buffer list to the offload target along with the miniport offload handle for the SA Offload Block. The offload target completes the asynchronous request when the buffer list can be re-used (i.e. when transmission is complete). As previously indicated, buffers are used to transfer messages and data, including datagrams. The posting of send buffers to the offload target is straightforward with the caveat of IPv4 option processing and IPv6 extension header processing. Sending IPv6 extension headers or IPV4 options needs to be preserved because any application traffic could be required to send IPV6 extension headers or IPv4 options. For the transmission of IPSec IPv6 datagrams, the host protocol stack creates the IPv6 extension headers and passes them to the offload target as part of the OffloadSend for them to be transmitted as part of the outgoing datagram. For maximum flexibility, two pointers are included in the OffloadSend—a pointer to IPv6 Extension headers to be inserted before the IPSec extension header(s)(note that there might be two—one for AH and one for ESP), and another pointer to IPv6 Extension headers to be inserted after the IPSec extension headers. For the transmission of IPSec IPv4 datagrams, the host protocol stack creates IPv4 option headers and passes them to the offload target as part of the OffloadSend for them to be transmitted as part of the outgoing datagram. A single pointer is used in the OffloadSend that points to the IPv4 option headers to be inserted into the outgoing datagram. If the offload target supports IP fragmentation, the IP option/extension headers must be replicated in every packet. Note that in-order transmission is not strictly required because all transport headers have already been placed into the datagram. However, in-order transmission is highly recommended to ensure upper layer protocols see maximum performance.

If IPv6 extension headers are present on received datagrams at the offload target, and the first header is not IPSec, the offload target must forward the datagram up the conventional datapath to the host stack. The host stack 902 will process the extension headers until the IPSec header is found, then forward the datagram to the IPSec Module 922, which will use the IPSec OffloadForward interface to send it down to the offload target 904 with all IP extension headers in tact. The offload target then performs the IPSec extension header processing for IPSec. Note that if AH is enabled, all IPSec extension headers must be present to enable datagram verification (i.e., hashing on immutable and mutable fields). If there are no more IPv6 extension headers left when the offload target is done, the offload target calls IPSecOffloadReceiveIndicate with a packet format that includes the full or partial IP header. If there are more IPv6 extension headers present (after the IPSec extension headers), the offload target calls IPSecOffloadReceiveIndicate with a packet format that includes the unprocessed extension headers and the application payload (decrypted/authenticated).

If the first extension header is IPv6, the offload target processes the IPv6 header(s) until either a non-IPSec extension header is found or a ULP header is found. If a non-IPSec extension header is found, the offload target calls IPSecOffloadReceiveIndicate with a packet format that includes the full IP header, the decrypted/authenticated ULP payload, and an offset to the next IPv6 extension header.

If IPv4 options are present on receive, the offload target must forward the received datagram up to the host stack 902 through the conventional NIC interface. The host stack will process the options, send the datagram to the IPSec module 922 for processing, and the IPSec Module 922 will forward the datagram to the offload target 904 through the IPSecOffloadForward interface with all options present. The offload target does no IPv4 option processing on the forwarded packet; it only uses the IP options if AH is enabled (i.e. it must be able to parse IPv4 options—mutable vs. immutable—for AH hashing or to find the IPSec header for ESP). After processing the IPSec options, the IP header and ULP decrypted/authenticated payload is passed back to the host stack with an offset to any IP options that have not been processed (i.e. any present after the IPSec header(s)).

The IPSec Chimney may cause the offload target to generate IP fragments if the upper-layer-protocol is not TCP. For example, TCP will resegment its outbound buffers to match the path MTU as it changes but UDP will not. Thus, the offload target must be able to generate IPv4 fragments if the datagram size through the send path exceeds the Path MTU. For reception of IPSec datagrams, IP fragments (either IPv4 or IPv6) should be handled by the offload target if the next header is an IPSec header (IPv4) or the extension header(s) contains an IPSec extension header (IPv6). However, because the offload target has a bounded amount of buffering, if a datagram arrives and has no IP defrag buffer space available, the offload target must not drop the packet. Instead, it must (attempt to) send it up the conventional NIC data path. Additionally, the offload target must forward all fragments either already in its defragment buffer or that arrive later which have the same fragment ID as the datagram sent up the conventional path for the internet packet lifetime (typically 120 seconds) after the datagram was sent up the conventional path. If the offload target runs out of room to track IP fragment IDs forwarded to the host stack, it must forward all fragments to the host stack. Note that because the state associated with tracking IP fragments sent to the host stack is significant, support for defragmentation is optional.

The offload target should not place any limits on the number of send requests that can be posted. If the offload target does not have the memory required to handle the send requests being posted to it, the offload target needs to manage the buffers in software. If a buffer is posted and there is no valid outbound SA (e.g., the outbound SA was not present to begin with or it was deleted through an offload update call), the offload target returns an error and does not transmit the buffer. If a buffer is posted and the outbound SA has been invalidated, then the buffer should be dropped and the call should complete in error.

Note that the IPSec module 922 can have multiple upper layers using a single SA Offload Block. As a result of this, there is no mechanism to pre-post buffers to the offload target because it would require upper layer protocol state to be embedded in the receive buffer. Therefore, only an indication interface is used for the IPSec Chimney 922, where the offload target has a pool of buffers that it uses to store the payload until a complete datagram has been received and processed. Once a complete datagram is received and processed (i.e. decrypted/authenticated), the offload target indicates the datagram directly to the IPSec Layer 922. The offload target indicates the information in table 1 to the host stack.

TABLE 1

| | |
|---|---|
| SA Offload Block stack handle | |
| SPI | (Note that while the SPI is technically not unique without the IP address, the reality is that the SA Offload Block has the same IP addresses for both SAs, thus only the SPI is needed with the SA Offload Block Handle). |
| Flags | Authenticated, Decrypted, Error Occurred, Error Occurred but No ValidSPI, IP Processing needed (more IP options/extension headers) |
| Error Type (only valid if Error flag is set) | |
| | EVENT_IPSec_AUTH_FAILURE - authentication was required but it failed for the datagram. Decryption failure Replay check failure EVENT_IPSec_BAD_PACKET_SYNTAX - Received IPSec datagram(s) with invalid packet syntax. EVENT_IPSec_UNEXPECTED_CLEARTEXT - (only occurs if a TCP state object is present in the offload target and the offload target attempted to deliver the incoming datagram to the TCP state object but the datagram was clear text). EVENT_IPSec_BAD_SPI_RECEIVED - only occurs if a TCP state object is present in the offload target and the offload target attempted to deliver the incoming decrypted/authed datagram to the TCP state object but the datagram SPI did not match a SPI required by the TCP connection). EVENT_IPSec_CRYPTO_INVALID_PROTOCOL EVENT_IPSec_Received_Multicast_MAC |
| NetBufferList | contains entire received packet, including MAC headers, etc. |
| Offset into buffer to next unprocessed IPv6 extension header (or payload if all extension headers are done) | |

If an IPSec datagram is received for a destination IP address with an SPI that does not match an inbound offloaded SA (e.g., the SA is either not present or has been deleted through the offload update interface), the offload target must forward the received data gram up the network stack.

If the IPSec processing of a received datagram fails in error, then the appropriate statistic must be incremented and the packet contents are forwarded to the host if the EnableSecurityAudit flag on the interface was set and an SPI is found that matched an offloaded SA. The packet contents are forwarded to the host using the IPSecReceiveIndicate call. Note that if the SPI for an offloaded SA can not be found, even if an error is found by the IPSec offload target, the offload target must not process it and instead send the incoming datagram up the conventional receive path. If a received datagram contains a MAC layer broadcast or multicast address and the SPI/network layer address matches an offloaded SA Offload Block, then the offload target must drop the packet and increment a statistic unless the interface EnableSecurityAudit flag is set. If the EnableSecurityAudit flag is set, the datagram is not processed and is forwarded to the host network stack through the IPSec Chimney interface.

Note that the IPSec layer forwards packets containing IPSec datagrams to the offload target for several reasons. These reasons include the datagram arriving on a different interface than the interface the SA Offload Block was sent to, the datagram contains IPv4 or IPv6 options/extension headers, and thus was sent up to the host stack by the offload target for Path Layer processing through the conventional NIC interface, race conditions during the offload initiation process, and race conditions in the offload termination process. A forwarding interface is used in the process of forwarding the IPSec datagrams. The forwarding interface to the offload target is asynchronous and hands the target information including the SA Offload Block miniport handle, flags (authenticated, decrypted), the NetBufferList that contains the entire received packet including MAC headers, the offset into the buffer to the next unprocessed IP option/extension header (or payload if all option/extension headers are done). If the IPSec Layer detects excessive traffic through the forwarding interface, it may upload the SA Offload Block.

As previously indicated, the second mode of data transfer is where the IPSec Chimney is embedded within another Chimney 916, 918. For example, if a TCP Chimney is layered on top of the IPSec Chimney, data transfer can occur through both the IPSec Chimney and the TCP Chimney, or through just the TCP Chimney, depending upon the system work load. If all data transfer is occurring through a higher layer chimney, the OffloadSend and OffloadReceiveIndicate IPSec Chimney interfaces (described in detail below) are not used. All other interfaces are used, including the forwarding interface, event indication interface, terminate offload, and invalidate offload interfaces. All functionality remains the same for these interfaces, regardless of what upper level chimney is in place. As mentioned previously, if an upload is requested, the processing is "lazy." The TCP stack will periodically cull offloaded state objects that are no longer valid (i.e. perform a terminate offload). When the reference count for a SA Offload Block reaches zero, the SA Offload Block will be uploaded. Note that while the IPSec Chimney is waiting for the reference count to reach zero so that a terminate offload can be performed, it may perform an OffloadInvalidate for a specific SA Offload Block.

Transmit processing is straightforward when data transfer is through a TCP Chimney. On the send side, the TCP Chimney posts an application buffer that is sliced into TCP segments by the offload target. The offload target has enough state (from the OffloadBlockList handed down during the InitiateOffload call) to find the appropriate outbound SA within an SA Offload Block. The offload target performs IPSec processing as indicated by the SA and sends the datagram. On the receive side, if TCP Chimney is used, the IPSec Chimney needs to decrypt the packet (if encryption is enabled on the SA) before TCP processing of the incoming IPSec payload. Additionally, the IPSec Chimney must authenticate the packet (if enabled) before TCP processing to ensure TCP error handling performs the same way as the host stack (e.g., if an authentication/decryption error occurs no TCP statistics are incremented). Before TCP processing occurs, the offload target must verify that the incoming IPSec datagram was processed using the SA Offload Block that was referenced by the TCP state object when the InitiateOffload occurred. Note that the SPI values will change over the lifetime of the offload, and there may be up to two SPIs associated with a specific SA Offload Block for inbound traffic (one active and one keepalive).

If there is more than one Keepalive SA, the host stack is responsible for processing any incoming datagrams. The IPSec Chimney offload target is required to send any unrecognized datagrams (i.e. containing a SPI that has not been offloaded) to the host stack for processing through the conventional NIC interface. The host stack processes the IPSec datagram, and then forwards it to TCP. TCP then forwards it to the offload target through the TCP Chimney forwarding interface for normal processing, with a flag stating the TCP Segment has passed security processing. The flag is required because otherwise the offload target could not differentiate between a clear text error (as described above) and a receive segment that has passed security checks.

The TCP Chimney architecture described above enables application pre-posted receive buffers to be posted directly to the offload target. The offload target can potentially DMA the authenticated/decrypted data directly into these buffers (after TCP processing). Thus TCP is able to provide zero copy data receive to an application. In one embodiment, in the context of IPSec Chimney, before the offload target modifies the contents of the pre-posted buffer, it authenticates (if enabled) the payload.

The IPSec Chimney provides significant versatility in handling updates to the SA Offload Block while the SA Offload Block is offloaded. One area of versatility is in re-keying. The reasons for a re-key include the SA lifetime being reached (i.e., the maximum amount of time that an SA can be valid has been reached) and the offload target indicating that an SA should be re-keyed (e.g., a soft limit has been reached). The SA Offload Block is not uploaded to re-key. Instead all re-key operations are done in-place.

Figure 15:
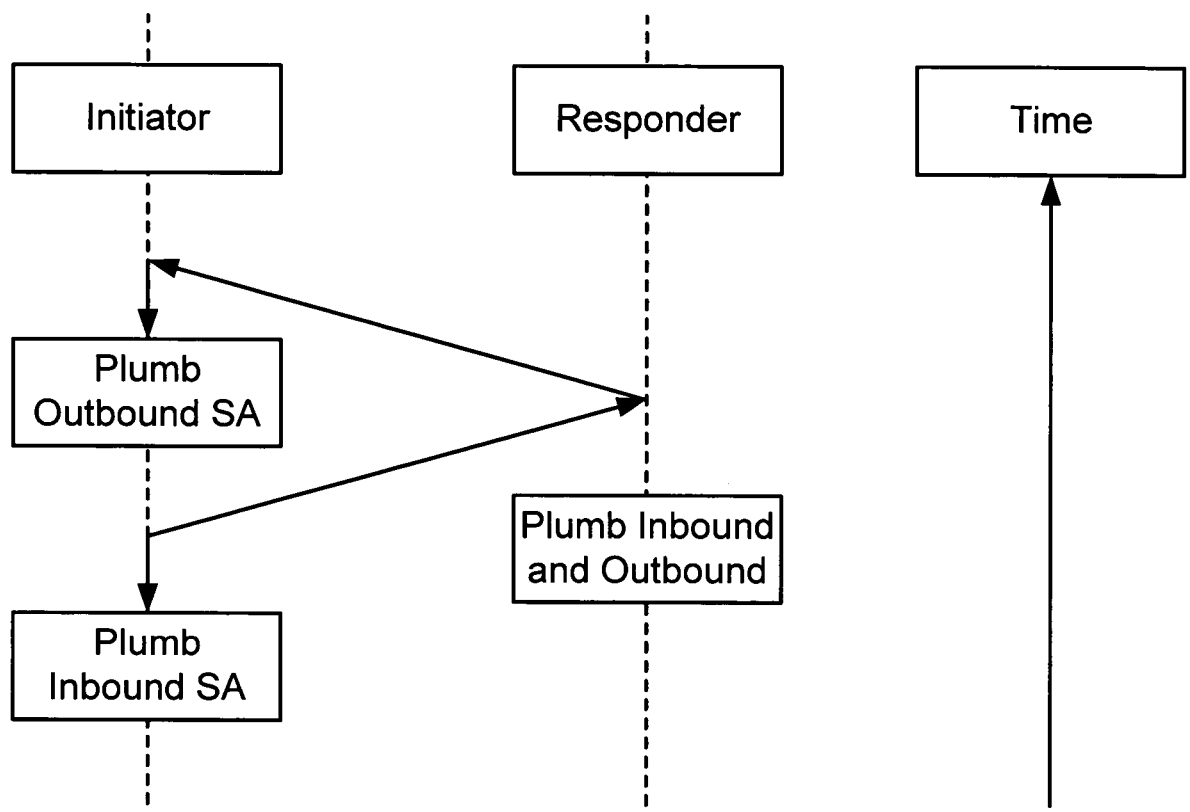
FIG. 15 is a ladder diagram illustrating the sequence of events for re-keying a security association within an offload IP security structure.

Turning now to FIG. 15, during a re-key, IKE (Internet Key Exchange) first plumbs a new inbound Security Association at the initiator and sends a message to the responder. The responder plumbs a new inbound and a new outbound Security Association. The reply from the responder allows the initiator to plumb an outbound Security Association. The IPSec driver can not get rid of the old inbound Security Association immediately on getting a new inbound Security Association. In the case of the initiator, the IKE message has to get to the peer and the peer has to process it to plumb a new inbound and outbound Security Association. Before the initiator can delete the old inbound SA, all of the data in-flight needs to be processed (i.e. all packets output by IPSec and either still in the output queue of the responder NIC or "in flight" in the network). The old SA is referred to as the Keepalive SA.

Similarly the responder has to wait for the initiator to plumb a new outbound SA and process all queued and in-flight packets on the old inbound SA before the responder can delete his old inbound SA. To provide this functionality, it is essential during re-key to have two inbound Security Associations alive for some period of time because the host does not know over which SA an inbound IPSec packet may come in. To account for this, a timer is used to keep the Keepalive inbound SA alive for a certain amount of time (e.g., 20 seconds, 50 seconds, 120 seconds, etc.) after the new outbound SA is plumbed. Note that if the soft limit is set to expire more quickly than the fixed time for the Keepalive SA, it is possible for more than one Keepalive SA to be valid. The invention supports more than one Keepalive SA (although only one will be offloaded, as previously described), even though some implementations may not support more than one KeepAlive SA.

The maximum lifetime of an SA is handled by the IPSec Layer (i.e. it will manage the associated timers, not the offload target). If the soft limit is reached, an SA re-key will occur. If a hard limit is reached the update offload interface will be called to delete the appropriate SA. If the SA has become a Keepalive SA, the IPSec Layer will maintain the timer and delete the SA when appropriate. This results in only one timer function being required for the offload target. The required timer function is the inbound SA idle time. For other timing operations such as the Outbound SA idle time, the offload target only needs to compare timestamps. The above approach reduces the hardware cost of offloading IPSec functions by reducing the number of timer functions processed in hardware, which is often a costly operation.

Other comparisons the offload target performs are Outbound SA idle time Outbound SA lifetime hard limit (compared for each packet), Inbound SA lifetime hard limit (compared for each packet), soft and hard byte count limit (compared for each packet) and soft and hard packet count limit (compared for each packet).

Now that the overall steps taken to offload IPSec functionality and some implementation details have been described, the interfaces shall be described. The IPSec Chimney architecture is designed to leverage existing call interfaces for TCP Chimney through the use of state object handles that are specific to certain layers (e.g. Neighbor Layer, Path Layer, TCP Layer, and IPSec Layer). The common calls with their corresponding completion calls are InitiateOffload, InitiateOffloadComplete, TerminateOffload, TerminateOffloadComplete, UpdateOffload, UpdateOffloadComplete, QueryOffload, and QueryOffloadComplete. InitiateOffload is used to initiate an offload. TerminateOffload is used to terminate an offload block. UpdateOffload, as described above, is used for an IPSec offload block to update variables and/or add, delete, or replace one or more security associations. QueryOffload is used to query an offloaded block for delegated variables.

The interfaces that are not common with the TCP Chimney include the IPSecOffloadTargetEvent interface and data transfer interfaces.

The InitiateOffload interface provides a new type of offload block structure referred to as an SA Offload Block. The miniport creates an SA Offload Block handle during the initial offload that the host stack uses to reference the offloaded state. The SA Offload Block can contain one or more SAs, in any combination of an outbound SA, an inbound SA, and a keepalive SA. The InitiateOffload interface, as a minimum, supports the following state offloads: one inbound SA, one outbound SA; two inbound SAs (one is a keepalive SA) and one outbound SA; one inbound SA; and one outbound SA.

The OffloadUpdate interface allows specific SAs within an SA Offload Block to be manipulated. The combination of the offload target handle, flag for inbound/outbound SA, and SPI are used to select a specific SA within an SA Block (as previously mentioned, while technically the SPI is only unique for a specific IP address, there is exactly one outbound SA and if there are two inbound SAs, they will both have the same IP address, thus the IP address is not needed). The InitiateOffload interface provides the ability to offload whatever SAs are currently valid (with the limit in one embodiment that a single keepalive SA is supported), and then update the offloaded state as either additional SAs are plumbed (e.g. an SA is moved to the keepalive state and a new SA is plumbed), overwritten (outbound SA or Inbound keepalive SA under some conditions), or deleted using the OffloadUpdate interface. To support this, the interface creates semantics for Add(new_SPI), Replace(old_SPI, new_SPI), and Delete (old_SPI), which can be combined in a single call to support the following functionality: add an outbound SA; add an inbound SA; replace an outbound SA; replace an inbound SA; add an inbound SA and replace an outbound SA; replace an inbound SA and replace an outbound SA; delete an inbound SA; delete an inbound SA and an outbound SA; delete two inbound SAs and one outbound SA; and delete an outbound SA. If an additional SA is added and there is insufficient hardware available for the new SA(s), the miniport can fail the update. If this occurs, the host stack will upload the SA offload block.

An SA can be deleted for the following reasons: keepalive SA expired (inbound SA); maximum SA lifetime has been reached; and for administrative reasons. An UpdateOffload Delete operation applies to the specific SAs within an SA Offload Block contained in the delete operation. Once the completion for the UpdateOffload is called, the offload target must remove all state associated with the specific SA. For example, a delete operation can change the number of SAs offloaded from three to two, and then an UpdateOffload Add operation may be performed. All receive or send processing for the deleted SA is the same as if the SA was never offloaded. If a TCP Chimney offloaded connection is dependent upon an IPSec Chimney SA Offload Block and the required outbound SA has been deleted, the TCP Chimney connection must not transmit any data and process the error in a fashion similar to if the path state was invalidated (e.g., indicate to the host stack that no valid state exists for outbound traffic as well as normal TCP retransmit timeout processing).

When a new outbound SA is plumbed with an OffloadUpdate Replace operation, the offload target overwrites the entire old outbound SA state (cached and delegated state—const state remains the same). The offload target would need to complete processing on outbound packets that are currently in the middle of using the old SA so that a specific datagram is either encoded completely with the old SA state or the new SA state. Note that an OffloadSend request may contain many IPSec datagrams, potentially representing a large amount of data. Because of this, the offload target should be able to stop processing in the middle of an OffloadSend request, finish encoding any IPSec datagrams it has started, and transition over to the new outbound SA for the rest of the OffloadSend (and any others that have been queued). Once the transition to the new SA has been completed, the OffloadUpdate call can be completed. Note that an OffloadUpdate Replace can change the AH and ESP SPIs as well as potentially their associated algorithms, keys, lifetimes etc.

Due to the generic interface and the host maintaining the keepalive timers, the offload target is not aware of whether an inbound SA is in the keepalive state, the larval active state, or active state. As a result of this, specific behaviors are supported by the above interfaces. The behaviors are:

Initial keying for IPSec bi-directional data transfer:
InitiateOffload of the larval active inbound SA (by the initiator)
InitiateOffload of the outbound and inbound SA (by the responder)
UpdateOffload to add the outbound SA (by the initiator after the larval active inbound SA was offloaded with InitiateOffload)
$1^{st}$ Rekey of an IPSec SA:
UpdateOffload to add a new inbound SA (Initiator—the old inbound SA becomes the keepalive SA, but the offload target is not aware of this).
UpdateOffload to add a new inbound SA and replace the old outbound SA (by the responder).
UpdateOffload to replace an outbound SA (initiator).
$2^{nd}$ (and more) rekey of an IPSec SA:
UpdateOffload to replace an inbound SA (initiator).
UpdateOffload to replace an inbound SA and replace the old outbound SA (by the responder).
UpdateOffload to replace an outbound SA (initiator).

And finally, after the keepalive timer fires or if the lifetime of an SA expires without re-keying:
UpdateOffload to delete an inbound SA (initiator and responder).
UpdateOffload to delete an inbound SA and outbound SA (no keepalive present).
UpdateOffload to delete both inbound SAs and the outbound SA.

Due to the complexity of combinations for add, replace, and delete, the approach taken for the chimney is to enable the update to include one, two, or three SAs, where each SA has an operator in the set {add, delete, replace}. To simplify the interface to the offload target, if a new IPSec filter is plumbed which would require an offloaded TCP connection to start using IPSec, the offloaded connection will be uploaded and then re-offloaded. The use of the combination of the SA Offload Block handle, inbound/outbound SA, and SPI to find the SA within the SA Offload Block is done so that the host stack is not responsible for managing individual SA locations within an SA Block. If an IPSec SA Offload Block would require more than one keepalive SA, then the rest of the keepalive SAs can be handled by the host software stack.

The Indication call interface from the offload target to the host is used to indicate generic events (e.g., common to the chimneys) and specific events for IPSec. The EventIndicate call is used for generic events. The IPSecEventIndicate call is used for specific events for IPSec. A SA expiration or an offload target initiated rekey will cause the offload target to call the IPSecEventIndicate to either request a rekey or to inform the IPSec Layer that a specific SA has expired. An IPSecEventIndicate contains the following arguments: SA Offload Block Handle, SPI, a flag that specifies whether the SPI is for an inbound or outbound SA, ActionRequested, and ActionReason. The ActionRequested and its associated ActionReason are a ReKeyRequest and a SAInvalidated.

The events notifications associated with ReKeyRequest are KbytesSoftReached and OutboundPacketSoftReached. The KbytesSoftReached event notifies the host that the number of kilobytes transferred has reached the soft limit threshold and the SA rekey process should be initiated. The OutboundPacketSoftReached event notifies the host that the number of packets that have been sent to date has reached the soft limit and the host stack should start the rekey operation.

The SAInvalidated event provides an indication to the host stack that the SA has been invalidated (i.e., expired) because a limit has been reached. The SAInvalidated events include KbytesHardReached, OutboundPacketHardReached, IdleTimeReached, and Packet count limit hit. The KbytesHardReached indicates that the number of kilobytes transferred has reached a hard limit and that the SA must be invalidated. The OutboundPacketHardReached indicates that the number of packets that have been sent has reached the hard limit. The IdleTimeReached indicates that the SA has not transferred data in a specified amount of time. For outbound SAs, the check is driven by attempted transmission of an IPSec datagram. The time of the last transmission is stored, and compared against the current time. If it is above the threshold, the offload target notifies the host, drops the packet, and marks the SA as invalid. This check is required to ensure a deadlock does not occur if the remote peer has crashed. A typical idle interval is 2 minutes. For inbound SAs, the check is driven by a timer to ensure that resources are cleaned up in a timely fashion. The timer is reset upon receipt of an IPSec packet on a specific SA. A typical idle interval is 5 minutes. The packet count limit hit indicates that the packet count limit has been reached.

The data transfer interface includes OffloadSend, OffloadSendComplete, and OffloadReceiveIndicate. The OffloadSend and OffloadSendComplete assume that the host stack can create IPv4 options or IPv6 extension headers to be inserted in the datagram to be transmitted. This includes inserting options before or after the AH and ESP headers. Thus the OffloadSend interface includes two additional pointers to IPv6 extension headers to be included before or after the AH/ESP headers as previously described (an alternate embodiment allows a third pointer to include options between the AH and ESP headers). For IPv4, the interface enables a single list of IPv4 options as previously described. An alternate embodiment allows a second or third pointer to enable options to be in front of, between, or after AH and ESP headers. The OffloadReceiveIndicate (for IPSec receive) indicates that data has been received. The OffloadReceiveIndicate includes the SPI and the entire IP header and payload (an alternate embodiment could include the MAC header, or include just the IPSec payload if no options are present), with an index into the IP options/extension headers to the next unprocessed header, and a set of flags stating the results of any processing done to date. Note that the AH and/or ESP headers do not have to contain valid data.

The QueryOffload interface allows the host stack to query the offloaded state of an SA. The parameters are the SA Offload Block Handle and the OffloadBlockList. The QueryOffload interface is typically used to query the delegated state of SAs. This may be necessary for a variety of reasons. During debug it may also query the state of Const and Cached variables to ensure that the offload target and the host are in synch.

The OffloadInvalidate interface signals that an offloaded SA has been invalidated. A specific SA within an SA Offload Block can expire (become invalid) because the offload target caused the invalidation or because the host called OffloadInvalidate. Note that an invalidated SA is different than a deleted SA. The deletion of an SA can occur through the OffloadUpdate interface with an opcode of Delete. In that case, there is no state for the SA left in the offload target. If an SA is invalidated, however, the state remains in the offload target until a TerminateOffload of the SA Offload Block occurs. The terminate offload will request all of the delegated state to be transferred back to the host. An OffloadInvalidate can occur for administrative reasons (e.g., a change in policy) or because termination of the offload has been requested, but the dependent TCP state object ref count is non-zero so the offload can not be terminated yet. While waiting for the refcount to go to zero, the SA is invalidated. The arguments for OffloadInvalidate are the Miniport SA Offload Block Handle and the OffloadBlockList. If the invalidated SA is an outbound SA, then a call to OffloadSend must be completed with an error and the data is not sent. If the invalidated SA is an inbound SA, then the received datagram is dropped (unless interface statistics are enabled) and the appropriate error counter is incremented.

Turning now to statistics, the offload target maintains statistics such that the host statistics reporting is unaffected regardless of whether an SA Offload Block is offloaded or not. The host protocol stack maintains per host statistics and per SA statistics. The IPSec chimney will query each IPSec chimney capable interface for its interface statistics whenever the host-wide statistics are queried. The IPSec offload target maintains the TCP chimney defined statistics for the Path Layer, and the normal NDIS statistics for the Data Link Layer (i.e., Framing Layer). In addition, it must maintain the following IPSec statistics, which are only incremented when an IPSec datagram is consumed by the offload target (i.e. not sent up the conventional data path).

The per interface statistics include 32-bit counters and 64 bit counters. The 32 bit counters are NumBadSPIPackets, NumPacketsNotDecrypted, NumPacketsNotAuthenticated, and NumPacketsWithReplayDetection. The 64 bit counters are ConfidentialBytesSent, ConfidentialBytesReceived, AuthenticatedBytesSent, AuthenticatedBytesReceived, OffloadedBytesSent, and OffloadedBytesReceived. Note that these counters do not necessarily require the hardware to implement a 64 bit counter. For example, the hardware could implement a 32 bit counter with the carry-out being an event to the host miniport to keep track of the upper 32 bits. The per interface statistics that are maintained purely by the host stack, with no offload target interaction are NumActiveAssociations, NumOffloadedSAs, NumPendingKeyOps, NumKeyAdditions, NumKeyDeletions, NumReKeys, NumActiveTunnels, TransportBytesSent, TransportBytesReceived, BytesSentInTunnels, and BytesReceivedInTunnels.

The per SA statistics require the offload target to track some statistics to support soft and hard limits. The same per interface counters are used to implement statistics queries on a per SA basis. The OffloadQuery interface will be used to retrieve the Delegated state for specific SA's to fill in the following 64 bit counter values if the statistics query is for an offloaded SA: ConfidentialBytesSent (uses DELEGATED parameter CurrentConfBytes for an outbound SA); ConfidentialBytesReceived (uses DELEGATED parameter CurrentConfBytes for an inbound SA); AuthenticatedBytesSent (uses DELEGATED parameter CurrentAuthBytes for an outbound SA); AuthenticatedBytesReceived (uses DELEGATED parameter CurrentAuthBytes for an inbound SA); TotalBytesSent (uses DELEGATED parameter CurrentBytes for an outbound SA); TotalBytesReceived (uses DELEGATED parameter CurrentBytes for an inbound SA); OffloadedBytesSent (the host stack will record the value of TotalBytesSent when the offload is initiated. When the OffloadedBytesSent parameter is needed, the host protocol stack will query the DELEGATED state for the offload target to find the CurrentBytes for the SA, and return that value minus the value when the SA was offloaded); and OffloadedBytesReceived (same method as OffloadedBytesSent, but applied to an inbound SA).

Security threats are a growing problem. The present invention takes into account known threats. Turning now to FIG. 16, external threats can be injected into the system from an application that sits above the TLNPI interface (presumably in user mode—kernel mode components are trusted components) or from the wire. The wire source can cause one of four data paths to be exercised. The four data paths are the traditional networking stack data path, the offload NIC data path, the IPSec forwarding interface from the host stack to the offload NIC (by sending a packet on a different interface), and an optional offload target internal interface between the IPSec Engine and the TCP Engine (this is only possible if TCP Chimney is supported by the offload target). There is also a privileged mode interface to allow an administrator to control the Offload Manager prioritization.

Internal attack points that are not data paths are to: load new firmware into the NIC (not all NICs support this); exercise the control path to update state in the offloaded IPSec SA Offload Block; and exercise the control path to force either an upload or a download.

There are no new threats related to SA setup/teardown because the host protocol stack performs all SA setup and teardown. Thus, the existing security analysis for the protocol stack applies for SA setup. All control packets, such as IKE, ICMP, ARP, and RIPv4 messages are processed by the host stack as well, thus host stack hardening for the processing of these messages remains in place. However, if the host stack state is updated, and a cached copy resides on the NIC, this can cause the control path to the IPSec Offload target to be exercised.

The host stack can forward IPSec datagrams through the forwarding interface to the NIC if the SA state is offloaded for a variety of reasons. One reason is for IPv4 options. If a datagram contains IPv4 options, the datagram is forwarded up to the host stack for IPv4 option processing before IPSec processing, and then forwarded to the offload target. Another reason is for IPv6 extension headers. If a datagram contains IPv6 options, the datagram is forwarded up to the host stack. Because IPv6 extension headers must be processed in order, there are several pathological cases that could cause multiple trips between the host stack and the offload target. The worst case is if the packet used AH and ESP, and there are IPv6 extension headers before the AH header, between the AH and ESP header, and after the ESP header. Another reason is for IP fragments. The offload target can reassemble IP fragments, but if it runs out of reassembly room it has the option of moving all fragments for a specific datagram through the conventional host interface. If this occurs, the host reassembles the datagram. Once reassembled, if they are an IPSec packet targeted for an offloaded SA, they are forwarded to the IPSec offload target for processing. Another reason is that an IPSec datagram was received off of a different interface and received by the host IPSec stack. Another reason is that an IPSec datagram was in flight up the host stack when the offload occurred. This is a transient condition.

The list of assets at risk include: the conventional NIC (no changes in the security analysis for the conventional path); offload NIC resources (primarily IPSec SA Offload Block, IP reassembly buffer, IPSec send buffer (not on all NICs), and CPU (if present)); system stability; IPSec SA Offload Block State (including credentials), Path State, Neighbor State; and data integrity. Note that IPSec Chimney supports a "Security Audit" mode which requires the offload target to forward any received datagrams which would normally be dropped due to errors (after incrementing the appropriate error counter) to the host stack. While this does not necessarily mitigate any specific threat, it ensures that the system administrator maintains the ability to inspect packets which may be attacking the system.

With respect to spoofing, tampering, and repudiation, certain types of traditional forms of wire attacks do not apply because the SA Offload Block is only offloaded after IKE negotiation of the SA. Presumably the anonymous attacks and man-in-the-middle attacks are not possible (subject to the assumption that the IPSec authentication or encryption algorithm has not been cracked). The offload target will only process an incoming packet if the IP address: SPI matches an offloaded SA. If an opponent attacks an offloaded SA, the hardware can drop the packet much faster than the host, thus the system will be more responsive than the traditional software stack. If the opponent attacks a non-offloaded SA or does not use IPSec, then the threat model is the same as the existing software stack threat model. If the opponent attempts to spoof, tamper, or repudiate with IP fragments (v4 or v6), the forwarding interface may be exercised. It is expected that the net CPU utilization will still be better than the host stack alone because the host stack does not have to do the hash or decrypt to verify that the packet is bad. The host stack simply reassembles the packet, forwards it to the offload target, and the offload target will drop the attacking packet (and increment a counter, as well as potentially forward it to the host if logging is enabled).

With respect to information disclosure, there is little opportunity for new mechanisms for information disclosure because there are no new wire protocols, and the only API changes are to allow a privileged administrator to set the Offload Manager prioritization and to allow any application to be able to see if an SA is currently offloaded. The concern is whether it is possible to apply various attacks to try to force upload/offload to consume valuable NIC resources (primarily the limited number of offload SAs) and/or CPU resources. One approach for attack would be to attempt to cause an upload/offload, then query the interface to see if the offload/upload was successful, and continue to iterate on the form of the attack to make it more successful. For this attack to work, the attacker either has to be on the local host or able to query statistics on the local host from a remote location. It can be detected by the system administrator though and they can either apply heuristics to disable offload from that subnet/host, or restrict offload to local connections, or some combination.

Arguably another form of information disclosure can occur if the remote node can cause code to be loaded onto the offloaded NIC (discussed in more detail below). Another issue is whether any new attacks are exposed because the keys are now in the offload target as well as the operating system. The only way to attack this resource is if the kernel has been compromised because there is no mechanism to access the hardware from user mode.

With respect to denial of service attacks, the attacks against the IPSec Chimney can be done by either a non-authenticated remote peer or by an infected, authenticated remote peer. As mentioned previously, if an unknown attacker attempts to attack an offloaded SA, the system performance will actually be better than if they attacked a non-offloaded SA due to the early drop of the attacking packet. The main resources that the remote node can attack are IP reassembly buffers, forcing upload of offloaded SAs, offload NIC CPU cycles, host CPU cycles, and system stability.

With regard to attacking IP reassembly buffers, if the remote node sends IP fragments, a significant amount of IP reassembly buffer space can be consumed along with associated Offload NIC CPU cycles to process the datagrams and deliver the reassembled datagram to the IPSec Engine. It is intended that the Offload target pass any datagrams that exceed its buffer space up to the host (of course the offload target must take care to not store some of a given IP Datagram in the offload target and forward other segments up to the host). This enables the host to track an IP fragment attack. Note that it is expected that there will be a net gain if the offloaded SA is being attacked, because of the computational cycles saved by the host stack in attempting to authenticate/decrypt the datagram. The host stack will defragment the packet, and then forward it to the offloaded SA to be authenticated/decrypted. Using this approach, if the attacker attempts to overrun the reassembly buffer, the host stack mitigations continue to be in place.

With regard to forcing upload of offloaded SAs, if the SAs being uploaded are being used by a wide variety of applications, it could affect system performance. Of particular concern is if there is a "magic" receive packet or send packet which could force an upload. The most general group policy is to use an SA Offload Block for all communication between two end-nodes. Thus if a magic packet is possible all communication between the two hosts would be effected. The IPSec Chimney has been specifically designed to not allow either a remote or local application to cause an upload. Thus, this type of attack is not possible. However, the mitigation does add significant complexity to the interface because of the forwarding required for IP option/extension header processing. This creates a potential attack on CPU cycles as discussed below.

With regard to attacking CPU cycles, the primary way to consume host CPU cycles is via excessive use of the forwarding interface. Note that a key metric used for the analysis here is whether the offload target introduces more CPU cycles on a particular processing path than the host stack would have if offload was not present. The remote node could create an SA (which is offloaded to a specific NIC) and then ping-pong back and forth between the current path and an alternate path, causing the IPSec datagrams to arrive on a different NIC. It is believed that the total CPU cycles to forward a datagram to the offload target and drop the attacking datagram is less than the cycles required to authenticate or decrypt the packet. Thus, the net effect of IPSec Chimney is a reduction in the computational cycles to drop the attacking packet. Another attack on the forwarding interface is to send IPv4/v6 options or extension headers. There is significant complexity around IPv4 options and IPv6 extension headers to ensure that neither a) a remote host that has been authenticated but has a malicious application can not force an upload nor b) a local application can not send a packet which would require an upload.

Because no magic packet is allowed, all IPv4 options and IPv6 extension headers are processed by the host (this ensures forward compatibility as new options are created, and also removes a potential attack surface in the offload target). However, this approach introduces forms of attack through the forwarding interface to enable IP option/extension header processing. For IPv4, in-order processing of options is not required. Thus, the offload target would forward the datagram to the host for option processing (i.e. non-offload packet code-path). After the host is done processing the options, it would forward the datagram to the offload target for IPSec processing. Again because of the cycle count reduction due to offload even when going through the forwarding interface, it is expected that this attack will not consume more CPU cycles than the host stack without offload. For IPv6, the worst case packet is one with both AH and ESP headers. If extension headers are in front of the IPSec AH header, between the AH and ESP header, and after the ESP header, to ensure in-order extension header processing, the packet could theoretically traverse the I/O bus five times if just IPSec offload is enabled, and potentially seven times if IPSec Chimney and TCP Chimney are enabled. The following sequence is the pathological ordering of events: First, a datagram is forwarded up to the host stack to process initial extension headers. The datagram is then forwarded to offload target for AH processing and it is successfully authenticated (i.e., an authenticated host is infected). After the offload target performs AH processing, it passes, and the offload target indicates the datagram to the host stack for further extension header processing. The host stack processes extension headers and forwards the datagram to the offload target for ESP processing. The offload target performs ESP processing, the datagram passes, and the offload target indicates the datagram to the host stack for further extension header processing. The host stack finishes extension header processing, forwards the datagram to TCP, which forwards it to the offloaded TCP connection. The offload target processes the TCP segment and indicates the payload to the application The above packet format is difficult to generate because the IPSec stack will not transmit IPv6 extension headers between the AH and ESP header. Additionally, if TCP sees significant traffic through the forwarding interface, it will upload the connection. This cuts the transitions down to five, and possibly three transitions. If the attacking peer is unknown (the typical attack), the processing is stopped after the datagram is forwarded to the offload target for AH processing, when the authentication fails. If the remote peer can pass authentication and decryption (e.g. a trusted peer is infected with a virus), then it is possible to exercise the above sequence. IPSec Chimney will include a mechanism to log excessive forwarding so that an administrator can take appropriate action against the offending peer. Because this case can only occur with an authenticated infected client, the mitigation is straightforward: plumb a filter to stop any further traffic from the client.

Examining the above in terms of whether the attacking packet would have consumed more CPU than that of a purely software host stack, the main additions of CPU utilization are forwarding overhead and IPSec Chimney receive indication overhead. The main reduction in CPU utilization is due to authentication/decryption offload. Depending on the datagram size, the net effect is either a clear win in the offloaded case (full MTU datagrams) or close to a draw (i.e. net CPU utilization is about the same). Thus, the main side-effect is bus bandwidth utilization, due to an authenticated remote host, which does not appear to be a significant risk.

Another DOS based attack is to inject neighbor updates or routing updates to cause either an incorrect MAC address to be chosen or incorrect interface to be chosen. This is an existing security issue with the host stack and because the host stack continues to process all of these types of messages, there are no new attack scenarios due to IPSec Chimney. The subtle difference is that additional CPU cycles can be consumed in the attack, both on the host and on the NIC (due to updates of cached state). However that is a fairly small side-effect compared to the more important attack window of being able to change the MAC address (note that this can also be viewed as a form of spoofing and/or repudiation).

Another form of attack is elevation of privilege. The main concern around elevation of privilege is whether the offload IPSec implementation, by some insecure mechanism (or bug), can enable a remote node to load code into the offload target. Requirements for NIC manufacturers should include that the manufacturer must not enable code to be loaded on the NIC directly unless the remote entity has been authenticated.

Another form of elevation of privilege is to force an offload when the system administrator has configured the Offload Manager to prevent the SA from being offloaded (i.e. the connection gets better service than the administrator desired), or to change an SA's priority compared to other processes for offload by guessing the heuristics to promote oneself in the queue. This was reviewed above in discussing information disclosure attacks.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof. The scope of the invention is, therefore, indicated by the appended claims rather than by the foregoing description. All changes which come within the meaning and range of equivalency of the claims are to be embraced within their scope.

We claim:

1. A computerized system comprising:
    an offload target comprising a processor to process datagrams with a first offloaded security association (SA); and
    a host having a secure internet protocol (IPSec) layer that, in response to expiration of an SA lifetime timer, re-keys the first offloaded SA by providing a second offloaded SA to the offload target and initializes and maintains a keepalive timer,
    wherein the IPSec layer deletes the first offloaded SA when the keepalive timer has expired.

2. The computerized system of claim 1, wherein the first offloaded SA is among a plurality of SAs packaged in an SA offload block.

3. The computerized system of claim 1, wherein the offload target maintains IPSec statistics.

4. The computerized system of claim 1, wherein the offload target advertises IPSec capabilities to the host.

5. The computerized system of claim 1, wherein the offload target is a network interface card.

6. The computerized system of claim 1, wherein the first offloaded SA is an inbound SA.

7. The computerized system of claim 6, wherein the security protocol identifier is an authentication header (AH) or an encapsulating security payload (ESP).

8. The computerized system of claim 1, wherein the first offloaded SA comprise a security parameter index, an internet protocol (IP) destination address, and a security protocol identifier.

9. A method of managing secure internet protocol (IPSec) operations in a computerized system, the method comprising acts of:
    operating the computerized system to
    (a) offload a security association (SA) offload block to an offload target, the SA offload block packaging an original SA;
    (b) establish a new SA in response to expiration of an SA lifetime timer for the original SA;
    (c) in response to the expiration of the SA lifetime timer, initialize a keepalive timer for the original SA; and
    (d) delete the original SA from the SA offload block in response to an expiration of the keepalive timer.

10. The method of claim 9, wherein the original SA is among a plurality of SAs packaged in the SA offload block.

11. The method of claim 9, further comprising:
    (e) maintaining IPSec statistics at the offload target.

12. The method of claim 9, further comprising:
    (e) advertising IPSec capabilities from the offload target to a host.

13. The method of claim 9, wherein the original SA is an inbound SA.

14. The method of claim 9, wherein the original SA comprise a security parameter index, an interne protocol (IP) destination address, and a security protocol identifier.

15. The method of claim 14, wherein the security protocol identifier is an authentication header (AH) or an encapsulating security payload (ESP).

16. A computer-readable memory device, comprising computer executable instructions, that when executed perform a method of managing secure internet protocol (IPSec) operations in a computerized system, the method comprising acts of:
    (a) offloading, from a host, a security association (SA) offload block to an offload target, the SA offload block packaging an original SA, the original SA being an inbound SA;
    (b) establishing a new SA in response to expiration of an SA lifetime timer for the original SA;
    (c) in response to the expiration of the SA lifetime timer, initializing a keepalive timer for the original SA; and
    (d) deleting the original SA from the SA offload block in response to an expiration of the keepalive timer.

17. The computer-readable memory device of claim 16, wherein the original SA is among a plurality of SAs packaged in the SA offload block.

18. The computer-readable memory device of claim 16, further comprising:
    (e) maintaining IPSec statistics at the offload target.

19. The computer-readable memory device of claim 16, further comprising:
    (e) advertising IPSec capabilities from the offload target to a host.

* * * * *

UNITED STATES PATENT AND TRADEMARK OFFICE
CERTIFICATE OF CORRECTION

| | | |
|---|---|---|
| PATENT NO. | : 7,783,880 B2 | |
| APPLICATION NO. | : 11/036167 | |
| DATED | : August 24, 2010 | |
| INVENTOR(S) | : James T. Pinkerton et al. | |

It is certified that error appears in the above-identified patent and that said Letters Patent is hereby corrected as shown below:

In column 52, line 34, in Claim 14, delete "interne" and insert -- internet --, therefor.

Signed and Sealed this
Nineteenth Day of July, 2011

David J. Kappos
*Director of the United States Patent and Trademark Office*